(12) United States Patent
Akutagawa

(10) Patent No.: US 6,283,742 B1
(45) Date of Patent: *Sep. 4, 2001

(54) MOLDING SYSTEM FOR PRODUCING SOLIDIFIED ARTICLES

(75) Inventor: Tokuji Akutagawa, Tokyo (JP)

(73) Assignee: Akutagawa Confectionary Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,720

(22) Filed: Dec. 20, 1999

Related U.S. Application Data

(62) Division of application No. 08/767,368, filed on Dec. 16, 1996, now Pat. No. 6,039,554.

(30) Foreign Application Priority Data

| Dec. 18, 1995 | (JP) | 7-329033 |
| Aug. 1, 1996 | (JP) | 8-203949 |
| Oct. 17, 1996 | (JP) | 8-274451 |

(51) Int. Cl.$^7$ ................................................. B29C 45/16
(52) U.S. Cl. ............................................................ 425/130
(58) Field of Search ................................. 425/130, 376.1, 425/447, 131.1; 249/105, 108; 222/459; 239/419, 423, 432, 590.5; 426/515, 660

(56) References Cited

U.S. PATENT DOCUMENTS

| 4,405,547 | * | 9/1983 | Koch et al. | 425/131.1 |
| 4,528,900 | * | 7/1985 | Simelunas | 425/130 |
| 6,039,554 | * | 3/2000 | Akutagawa | 425/130 |

* cited by examiner

Primary Examiner—Tim Heitbrink
(74) Attorney, Agent, or Firm—Malcolm B. Wittenberg

(57) ABSTRACT

A molding system for use in producing a solidified article having a predetermined composite pattern formed of at least two kinds of viscous fluids distinct from each other in color, the system including: at least one discrete passage per each of the viscous fluids, and at least one discrete passage outlet per each of the viscous fluids separately guided through the at least one discrete passage, a method for producing the solidified article, an apparatus for producing the solidified article, and a method for producing the solidified articles.

18 Claims, 10 Drawing Sheets

MOLDING SYSTEM FOR PRODUCING SOLIDIFIED ARTICLES

This application is a divisional of prior application Ser. No. 08/767,368 filed Dec. 16, 1996, now U.S. Pat. No. 6,039,554.

BACK GROUND OF THE INVENTION

The present invention relates to a molding system for charging viscous fluids into a unit mold for use in producing a solidified article having a predetermined composite pattern, a method for producing a solidified article having a predetermined composite pattern, an apparatus for producing solidified articles having a predetermined composite pattern, and a method for producing solidified articles having a predetermined composite pattern.

PRIOR ART

Solidified articles formed by molding and solidifying viscous fluids, such as solidified chocolates, have hitherto been produced by a method wherein the liquid chocolate to be molded is measured by a depositor (a volume regulating filling machine), while the liquid chocolate is stirred in a storage tank thereof for maintaining the homogeneous state of the liquid chocolate, and charged into a desired mold. In this method, a molding system is adopted wherein a single kind of liquid chocolate is guided through a single discrete passage to a desired single unit mold for molding a single solidified chocolate (solidified article).

On the other hand, for forming a composite pattern on the solidified chocolate, two kinds of liquid chocolates are stored together in a single tank, measured in the mixed state, and charged into a desired unit mold, thereby forming a composite pattern. In this method, since the two kinds of liquid chocolates are previously mixed prior to the measurement, the ratio of the liquid chocolates in each solidified chocolate to be produced is different, so that solidified chocolates having the same (uniform) composite pattern (solidified articles having a predetermined composite pattern formed of at least two kinds of viscous fluids) cannot be produced.

Alternatively, there is proposed a method for producing a solidified article having a composite pattern, wherein a desired liquid chocolate is dotted onto the inner surface of the mold by a brush or the like, and another kind of liquid chocolate is charged by the depositor to form the composite pattern. However, this method requires a great amount of time and effort in the time-consuming dotting process. Further, each of the obtained solidified chocolates has a different composite pattern, as in the above case.

SUMMARY OF THE INVENTION

It is a primary object of the present invention to provide a molding system which can charge two or more kinds of viscous fluids distinct from each other in color into a desired unit mold in a predetermined state, and a method for producing a solidified article having a predetermined composite pattern easily with high accuracy using the above molding system.

It is another object of the present invention to provide a molding system which can charge at least two kinds of viscous fluids distinct from each other in color into a unit mold in a state wherein the streams of the viscous fluids are merged and collected, or wherein the streams of the viscous fluids are suitably mixed, and a method for producing a solidified article which can produce a solidified article having a predetermined composite pattern suitably mingled easily and accurately.

It is another object of the present invention to provide a molding system which can charge at least two kinds of viscous fluids distinct from each other in color in a predetermined state suitably mingled to a desired extent into a unit mold, and a method for producing a solidified article having a predetermined composite pattern suitably mingled to a desired extent easily and accurately.

It is another object of the present invention to provide a molding system which can charge at least one viscous fluid to be enclosed inside and at least two kinds of viscous fluids to surround the at least one viscous fluid in a predetermined state into a unit mold, and a method for producing a solidified article having at least one viscous fluid inside and at least two kinds of viscous fluids surrounding therearound covering the at least one viscous fluid easily and accurately.

It is another object of the present invention to provide a molding system which can charge at least one viscous fluid to be enclosed inside and at least two kinds of viscous fluids to surround the at least one viscous fluid in a predetermined collected and merged state or in a predetermined state suitably mingled, into a unit mold, and a method for producing a solidified article having at least one viscous fluid inside and at least two kinds of viscous fluids surrounding therearound covering the at least one viscous fluid in suitably mingled state easily and accurately.

It is another object of the present invention to provide a molding system which can charge at least one viscous fluid to be enclosed inside and at least two kinds of viscous fluids to surround the at least one viscous fluid in a predetermined state suitably mingled to a desired extent, into a unit mold, and a method for producing a solidified article having at least one viscous fluid inside and at least two kinds of viscous fluids surrounding therearound covering the at least one viscous fluid in a predetermined state suitably mingled to a desired extend easily and accurately.

It is another object of the present invention to provide an apparatus which can mass-produce solidified articles having a predetermined composite pattern formed of at least two kinds of viscous fluids distinct from each other in color, and a method which can mass-producing such solidified products effectively.

It is another object of the present invention to provide an apparatus which can mass-produce solidified articles having a predetermined composite pattern suitably mingle formed of at least two kinds of viscous fluids distinct from each other in color, and a method which can mass-producing such solidified products effectively.

It is another object of the present invention to provide an apparatus which can mass-produce solidified articles having a predetermined specific composite pattern such as spiral or zigzag pattern formed of at least two kinds of viscous fluids distinct from each other in color, and a method which can mass-producing such solidified products effectively.

It is another object of the present invention to provide an apparatus which can mass-produce solidified articles having a predetermined, suitably-mingled, specific composite pattern such as spiral or zigzag pattern formed of at least two kinds of viscous fluids distinct from each other in color, and a method which can mass-producing such solidified articles effectively.

It is another object of the present invention to provide an apparatus which can mass-produce solidified articles having a predetermined composite pattern formed of at least two kinds of viscous fluids distinct from each other in color which are continuously supplied, and a method which can mass-producing such solidified products effectively.

It is another object of the present invention to provide an apparatus which can mass-produce solidified articles having a predetermined composite pattern suitably mingle formed of at least two kinds of viscous fluids distinct from each other in color which are continuously supplied, and a method which can mass-producing such solidified products effectively.

It is another object of the present invention to provide an apparatus which can mass-produce solidified articles having a predetermined specific composite pattern such as spiral or zigzag pattern formed of at least two kinds of viscous fluids distinct from each other in color which are continuously supplied, and a method which can mass-producing such solidified products effectively.

It is another object of the present invention to provide an apparatus which can mass-produce solidified articles having a predetermined, suitably-mingled, specific composite pattern such as spiral or zigzag pattern formed of at least two kinds of viscous fluids distinct from each other in color which are continuously supplied, and a method which can mass-producing such solidified articles effectively.

It is another object of the present invention to provide an apparatus which can mass-produce solidified articles having at least one viscous fluid extending longitudinally inside as a central axis and a composite pattern surrounding thereof formed of at least two kinds of viscous fluids in a predetermined state, which viscous fluids are continuously supplied, and a method which can mass-produce such solidified articles effectively.

It is another object of the present invention to provide an apparatus which can mass-produce solidified articles having at least one viscous fluid extending longitudinally inside as a central axis and a composite pattern surrounding thereof formed of at least two kinds of viscous fluids in a predetermined mingled state, which viscous fluids are continuously supplied, and a method which can mass-produce such solidified articles effectively.

It is another object of the present invention to provide an apparatus which can mass-produce solidified articles having at least one viscous fluid extending longitudinally inside as a central axis and a predetermined, specific composite pattern, such as spiral or zigzag pattern, surrounding thereof formed of at least two kinds of viscous fluids in a predetermined mingled state, which viscous fluids are continuously supplied, and a method which can mass-produce such solidified articles effectively.

It is another object of the present invention to provide an apparatus which can mass-produce solidified articles having at least one viscous fluid extending longitudinally inside as a central axis and a predetermined, specific, suitably-mingled, composite pattern, such as spiral or zigzag pattern, surrounding thereof formed of at least two kinds of viscous fluids in a predetermined mingled state, which viscous fluids are continuously supplied, and a method which can mass-produce such solidified articles effectively.

It is another object of the present invention to provide an apparatus which can mass-produce solidified articles having a predetermined composite pattern formed of at least two kinds of viscous fluids distinct from each other in color which are supplied intermittently, and a method which can mass-produce such solidified articles effectively.

It is another object of the present invention to provide an apparatus which can mass-produce solidified articles having a predetermined composite pattern suitably mingled to a desired state formed of at least two kinds of viscous fluids distinct from each other in color which are supplied intermittently, and a method which can mass-produce such solidified articles effectively.

It is another object of the present invention to provide an apparatus which can mass-produce solidified articles having a predetermined, specific, composite pattern, such as spiral or zigzag pattern formed of at least two kinds of viscous fluids distinct from each other in color which are supplied intermittently, and a method which can mass-produce such solidified articles effectively.

It is another object of the present invention to provide an apparatus which can mass-produce solidified articles having a predetermined, specific, composite pattern suitably mingled to a desired state, such as spiral or zigzag pattern formed of at least two kinds of viscous fluids distinct from each other in color which are supplied intermittently, and a method which can mass-produce such solidified articles effectively.

It is another object of the present invention to provide an apparatus which can mass-produce solidified articles having at least one viscous fluid inside and a composite pattern surrounding thereof formed of at least two kinds of viscous fluids in a predetermined state, which viscous fluids are supplied intermittently, and a method which can mass-produce such solidified articles effectively.

It is another object of the present invention to provide an apparatus which can mass-produce solidified articles having at least one viscous fluid inside and a composite pattern surrounding thereof formed of at least two kinds of viscous fluids in a predetermined, suitably-mingled state, which viscous fluids are supplied intermittently, and a method which can mass-produce such solidified articles effectively.

It is another object of the present invention to provide an apparatus which can mass-produce solidified articles having at least one viscous fluid inside and a composite pattern surrounding thereof formed of at least two kinds of viscous fluids in a predetermined specific pattern suitably mingled to a desired extent, such as spiral or zigzag pattern, which viscous fluids are supplied intermittently, and a method which can mass-produce such solidified articles effectively.

The present invention is made in view of the above objects.

According to the present invention, there is provided a molding system for use in producing a solidified article having a predetermined composite pattern formed of at least two kinds of viscous fluids distinct from each other in color, said system comprising:

at least one discrete passage per each of said viscous fluids for separately guiding a predetermined amount of each of the viscous fluids to a unit mold for forming a single solidified article, each of the viscous fluids having been measured separately to have a predetermined amount, and at least one discrete passage outlet per each of said viscous fluids separately guided through said at least one discrete passage, each of said at least one discrete passage outlet per each of the viscous fluids being arranged in a plane facing the unit mold.

According to the present invention, there is provided the molding system of the above type wherein said discrete passage outlets are arranged in said plane so that at least one discrete passage outlet is surrounded by rest of the discrete passage outlets.

According to the present invention, there is provided the molding system of the above type further comprising:

at least one uniting passage communicating with said discrete passage outlets discharging at least two kinds of the viscous fluids among all of said discrete passage outlets, and at least one uniting passage outlet provided at one end of said at least one uniting passage, said at least one uniting passage outlet facing the unit mold.

According to the present invention, there is provided the molding system of the above type wherein said at least one uniting passage has a plate having at least one orifice therein for passing the viscous fluids, said plate being disposed in the middle of the uniting passage in a plane transverse to a flow direction of the viscous fluid through the uniting passage.

According to the present invention, there is provided a method for producing a solidified article having a predetermined composite pattern formed of at least two kinds of viscous fluids distinct from each other in color, said method comprising the steps of:

separately measuring said at least two kinds of viscous fluids, passing each of said separately measured viscous fluids through at least one discrete passage per each of said viscous fluids for separately guiding each of said viscous fluids, discharging said viscous fluids from said at least one discrete passage per each of said viscous fluids through at least one discrete passage outlet per each of said separately guided viscous fluids, each of said at least one discrete passage outlet per each of the viscous fluids being arranged in a plane facing the unit mold, and receiving and solidifying all kinds of said discharged viscous fluids in a unit mold to form a solidified article having a predetermined composite pattern.

According to the present invention, there is provided the method as mentioned above wherein said discrete passage outlets are arranged in said plane so that at least one discrete passage outlet is surrounded by rest of the discrete passage outlets, and wherein a timing for discharging said viscous fluids through said discrete passage outlets are controlled so that discharge of the viscous fluid through said at least one surrounded discrete passage outlet starts later and ends earlier than discharge of the viscous fluids through said rest of the discrete passage outlets.

According to the present invention, there is provided a method for producing a solidified article having a predetermined composite pattern formed of at least two kinds of viscous fluids distinct from each other in color, said method comprising the steps of:

separately measuring said at least two kinds of viscous fluids, passing each of said separately measured viscous fluids through at least one discrete passage per each of said viscous fluids for separately guiding each of said viscous fluids, discharging said viscous fluids from said at least one discrete passage per each of said viscous fluids through at least one discrete passage outlet per each of said separately guided viscous fluids, each of said at least one discrete passage outlet per each of the viscous fluids being arranged in a plane, passing at least two kinds of said viscous fluids of all the discharged viscous fluids through at least one uniting passage, discharging said at least two kinds of said viscous fluids from the uniting passage through at least one uniting passage outlet provided at one end of said at least one uniting passage, and receiving and solidifying all kinds of said viscous fluids including said viscous fluids discharged through said at least one uniting passage outlet in a unit mold to form a solidified article having a predetermined composite pattern.

According to the present invention, there is provided the method as described above wherein said discrete passage outlets are arranged in said plane so that at least one discrete passage outlet is surrounded by rest 6f the discrete passage outlets, and wherein a timing for discharging said viscous fluids through said discrete passage outlets are controlled so that discharge of the viscous fluid through said at least one surrounded discrete passage outlet starts later and ends earlier than discharge of the viscous fluids through said rest of the discrete passage outlets.

According to the present invention, there is provided the method as described above wherein the viscous fluid discharged through said at least one discrete passage outlet is passed through at least one second discrete passage in stead of said uniting passage, discharged from said second discrete passage through at least one second discrete passage outlet provided at one end of said at least one second discrete passage, and received and solidified in said unit mold to form the solidified article together with the rest of the viscous fluids.

According to the present invention, there is provided the method as described above wherein a plate is disposed in the middle of the uniting passage in a plane transverse to a flow direction of the viscous fluids through the uniting passage, said plate having at least one orifice therein for passing the viscous fluids.

According to the present invention, there is provided an apparatus for producing solidified articles having a predetermined composite pattern formed of at least two kinds of viscous fluids distinct from each other in color, said apparatus comprising:

a first nozzle having at least one discrete passage per each of said viscous fluids for separately guiding a predetermined amount of each of the viscous fluids, and at least one discrete passage outlet per each of said viscous fluids separately guided through said at least one discrete passage, each of said at least one discrete passage outlet per each of said viscous fluid being arranged in a plane, means for supplying said at least two kinds of viscous fluids to said at least one discrete passage per each of said viscous fluids in said first nozzle, a second nozzle having at least one uniting passage communicating with said discrete passage outlets discharging at least two kinds of the viscous fluids among all of said discrete passage outlets in the first nozzle, and at least one uniting passage outlet for discharging said viscous fluids guided through said at least one uniting passage, and a conveyer for receiving and transferring all kinds of said viscous fluids discharged through said at least one uniting passage outlet in the second nozzle.

According to the present invention, there is provided the apparatus of the above type wherein said discrete passage outlets of the first nozzle are arranged in said plane so that at least one discrete passage outlet is surrounded by rest of the discrete passage outlets.

According to the present invention, there is provided the apparatus of the above type wherein said second nozzle further has at least one second discrete passage communicating with said at least one discrete passage outlet of said first nozzle, and at least one second discrete passage outlet for discharging said viscous fluids guided through said at least one second discrete passage.

According to the present invention, there is provided the apparatus of the above type further comprising a timing means for controlling timing for discharging the viscous fluids through said at least one uniting passage outlet and said at least one second discrete passage outlet of the second nozzle so that discharge of the viscous fluid through said at least one second discrete passage outlet starts later and ends earlier than discharge of the viscous fluids through said at least one uniting passage outlet.

According to the present invention, there is provided the apparatus of the above type further comprising cutting means for cutting said all kinds of said viscous fluids received on the conveyer into pieces.

According to the present invention, there is provided the apparatus of the above type wherein said at least one uniting passage has a plate having at least one orifice therein for passing the viscous fluids, said plate being disposed in the middle of the uniting passage in a plane transverse to a flow direction of the viscous fluid through the uniting passage.

According to the present invention, there is provided the apparatus of the above type further comprising rotatably driving means for rotating said first nozzle and/or said second nozzle around an axis perpendicular to said plane wherein discrete passage outlets of the first nozzle are arranged.

According to the present invention, there is provided a method for producing solidified articles having a predetermined composite pattern formed of at least two kinds of viscous fluids distinct from each other in color, said method comprising the steps of:

supplying said at least two kinds of viscous fluids separately in a predetermined ratio, passing each of said separately supplied viscous fluids through at least one discrete passage per each of said viscous fluids for separately guiding each of said viscous fluids, discharging said viscous fluids from said at least one discrete passage per each of said viscous fluids through at least one discrete passage outlet per each of said separately guided viscous fluids, each of said at least one discrete passage outlet per each of the viscous fluid being arranged in a plane, passing at least two kinds of said viscous fluids of all the discharged viscous fluids through at least one uniting passage, discharging said at least two kinds of said viscous fluids from said at least one uniting passage through at least one uniting passage outlet provided at one end of said at least one uniting passage, receiving and transferring all kinds of said viscous fluids including said viscous fluids discharged through said at least one uniting passage outlet on a conveyer to form solidified articles.

According to the present invention, there is provided the method as described above wherein said discrete passage outlets of the first nozzle are arranged in said plane so that at least one discrete passage outlet is surrounded by rest of the discrete passage outlets of the first nozzle.

According to the present invention, there is provided the method as described above wherein the viscous fluid discharged through said at least one discrete passage outlet is passed through at least one second discrete passage in stead of said uniting passage, discharged from said second discrete passage through at least one second discrete passage outlet provided at one end of said at least one second discrete passage, and received and transferred on the conveyer to form the solidified articles together with the rest of the viscous fluids.

According to the present invention, there is provided the method as described above wherein said steps of supplying said at least two kinds of viscous fluids separately; passing each of said separately supplied viscous fluids; discharging said viscous fluids from said at least one discrete passage; passing at least two kinds of said viscous fluids; and discharging said at least two kinds of said viscous fluids from said at least one uniting passage are carried out continuously to form an elongate aggregate of solidified articles.

According to the present invention, there is provided the method as described above further comprising a step of cutting said elongate aggregate of solidified articles received on the conveyer into pieces.

According to the present invention, there is provided the method as described above wherein said steps of supplying said at least two kinds of viscous fluids separately; passing each of said separately supplied viscous fluids; discharging said viscous fluids from said at least one discrete passage; passing at least two kinds of said viscous fluids; and discharging said at least two kinds of said viscous fluids from the uniting passage are carried out intermittently.

According to the present invention, there is provided the method as described above wherein a timing for discharging the viscous fluid through said at least one uniting passage outlet and said at least one second discrete passage outlet of the second nozzle is controlled so that discharge of the viscous fluid through said at least one second discrete passage outlet starts later and ends earlier than discharge of the viscous fluids through said at least one uniting passage outlet.

According to the present invention, there is provided the method as described above wherein a plate is disposed in the middle of the uniting passage in a plane transverse to a flow direction of the viscous fluid through the uniting passage, said plate having at least one orifice therein for passing the viscous fluids.

According to the present invention, there is provided the method as described above wherein said first nozzle and/or said second nozzle are rotated around an axis perpendicular to said plane wherein discrete passage outlets of the first nozzle are arranged.

In the present invention, "at least two viscous fluids distinct from each other in color" means two kinds of viscous fluids which are different in strength of color, or thickness of color, or in tone, and additionally in other properties such as viscosity.

The solidified article having a "composite pattern" include a solidified article having a pattern wherein the boundaries in a specific pattern such as striped or staggered pattern formed of at least two viscous fluids are mingled or mixed on at least a portion of the solidified article, or a solidified article having a marbled pattern on a portion of or entire body of the solidified article.

The at least one discrete passage per each of said viscous fluids for separately guiding each of the viscous fluids may be an independent single passage, or a branched passage, and these may be employed in combination as desired. The discrete passage per each of said viscous fluids may be provided as follows:

one discrete passage is provided for guiding one kind of viscous fluid so that the total number of the discrete passage is equal to the number of kinds of the viscous fluids;

two or more discrete passages are provided for guiding each of the viscous fluids;

two or more discrete passages are provided for guiding one kind of viscous fluid, and branched discrete passages are provided for guiding other viscous fluids;

branched discrete passages are provided for guiding each of the viscous fluids; or other combinations of the discrete passages may also be employed as desired. In any case, two or more kinds of viscous fluids are not guided in a single discrete passage. The viscous fluids are never mixed in the discrete passage.

The discrete passage outlets may be arranged in a plane facing a unit mold or a conveyer regularly or irregularly. For example, in the case wherein two kinds of the viscous fluids A and B are employed, the discrete passages for guiding the viscous fluids A and B may be arranged regularly such as "ABAB . . . ", "AABAAB . . . ", or "ABAABBAAABBB . . . "; or irregularly such as "AABABBAB . . . ". The discrete passages may be arranged adjacent to each other or arbitrarily. The configuration and number of the discrete passage outlets may be determined one by one, as a unit, or arbitrarily.

The unit mold means a mold for forming a single solidified article itself.

The uniting passage means a passage for collecting the streams of at least two viscous fluids discharged through at least two discrete passage outlets When this uniting passage is configured so that the inner surface there of is tapered radially inwardly toward the flow direction of the viscous fluids, the streams of the viscous fluids discharged through the discrete passage outlets may be collected, merged, and/or mixed as desired. The uniting passage may be of any cross sectional shape or number, and a plurality of uniting passages are arbitrarily combined in parallel or in series in the flow direction of the viscous fluids as desired. The uniting passage may have a plate having at least one orifice therein, disposed in the middle of the uniting passage in a plane transverse to the flow direction of the viscous fluids through the uniting passage. With this embodiment, a predetermined composite pattern or a predetermined mingled composite pattern of the solidified article is suitably mixed to a desired extent depending on the combination thereof.

A timing means may be, for example, means for setting and maintaining the discharge timing of each of the viscous fluids at a depositor for measuring each of the viscous fluids, or other known means may be used.

In the present invention, "carry out the step of 'supplying said at least two kinds of viscous fluids separately' intermittently" means to measure each of the viscous fluids separately, and to supply each of the measured viscous fluids at every predetermined time. As a specific means for this process, a depositor (a device for charging predetermined amount) may be used.

On the other hand, "carry out the step of 'supplying said at least two kinds of viscous fluids separately' continuously" means to supply each of the viscous fluids continuously at a predetermined ratio without stopping. As a specific means for this process, a pump for high viscosity fluids such as a gear pump or a snake pump may be used.

Similarly, "carry out the steps of 'passing each of said separately supplied viscous fluids', 'discharging said viscous fluids from said at least one discrete passage', 'passing at least two kinds of said viscous fluids', and 'discharging said at least two kinds of said viscous fluids from the uniting passage' intermittently", and "carry out the steps of 'passing each of said separately supplied viscous fluids', 'discharging said viscous fluids from said at least one discrete passage', 'passing at least two kinds of said viscous fluids', and 'discharging said at least two kinds of said viscous fluids from the uniting passage' continuously" is interpreted in the similar manner as described above.

The conveyer used for the present invention functions also as molds, and specific embodiments of the conveyer may include a conveyer having a simple plane surface (FIG. 1(c)), a conveyer having side walls on either sides of the belt (FIG. 11(a)), a conveyer substantially having molds (FIG. 11(b)), and a conveyer having a belt provided with desired configuration thereon (FIG. 11(c)). Specifically, when the conveyer having side walls on either sides of the belt (FIG. 11(a)), or the conveyer substantially having molds (FIG. 11(b)) is used, fluidization of the viscous fluids may be stopped within a desired area depending on the fluidizing degree (viscosity) of the viscous fluids. When the conveyer having a belt provided with desired configuration thereon (FIG. 11(c)) is used, solidified articles of a specific configuration having a predetermined composite pattern may be mass-produced.

In the present invention, the solidified article to be produced and the viscous fluids may be a food material which is in a liquid state and can be solidified into a solid state by cooling or heating, for example, chocolate, ice deserts, jelly, butter, cheese and so on. When the present molding system, method for producing a solidified article, an apparatus, or a method for producing solidified articles is used with such food materials, solidified food articles having stabilized appearance and quality can be mass-produced easily and accurately.

BRIEF DESCRIPTION OF THE DRAWINGS

FIGS. 1(a) and 1(b) are schematic perspective exploded views of an embodiment of a molding system of the present invention, wherein FIG. 1(a) shows an embodiment of a porous nozzle, while FIG. 1(b) shows an embodiment of a uniting nozzle.

FIGS. 5(a) and 5(b) are schematic perspective exploded views of another embodiment of the molding system of the present invention, wherein FIG. 5(a) shows another embodiment of the porous nozzle, while FIG. 5(b) shows another embodiment of the uniting nozzle.

PREFERRED EMBODIMENTS OF THE INVENTION

The present invention will now be explained in more detail with reference to Examples, but the present invention is not limited thereto.

EXAMPLE 1

Figure 1A:
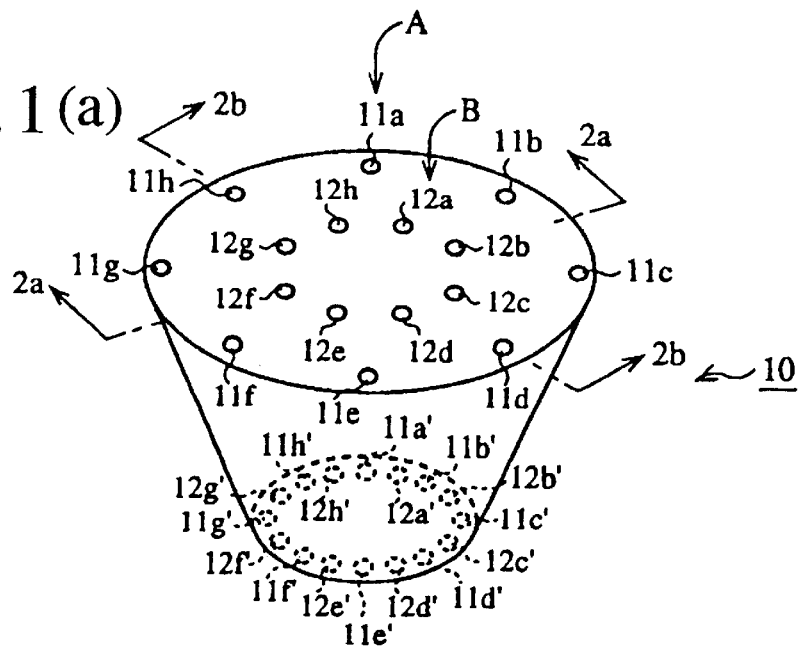
Figure 1B:
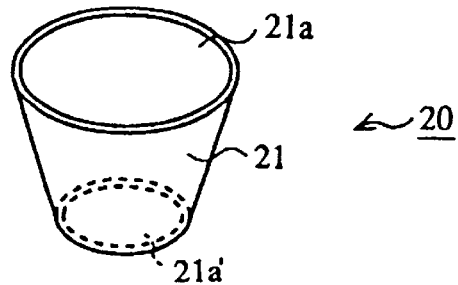
Figure 1C:
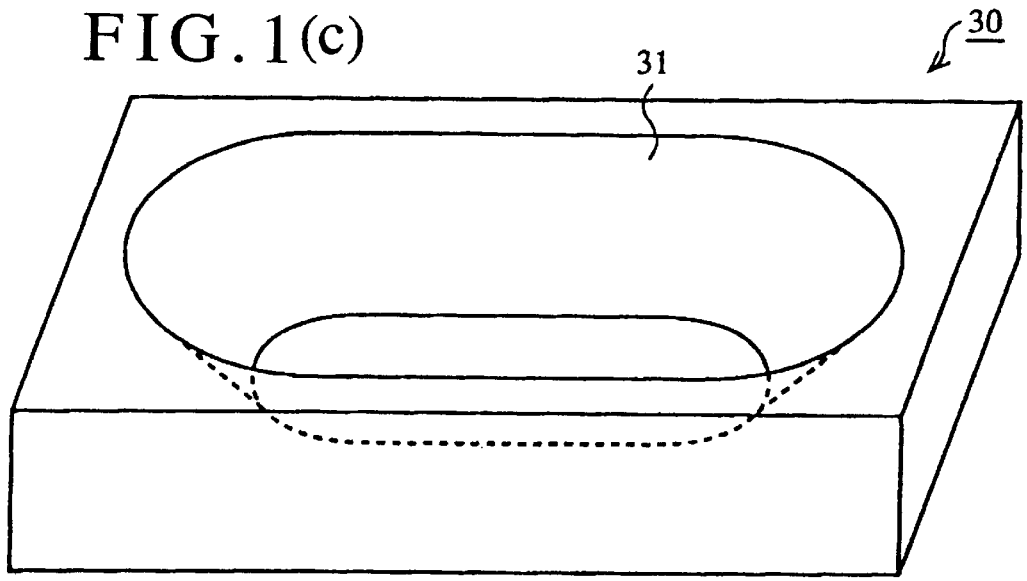
FIG. 1(c) is a schematic perspective view of an example of a unit mold for forming a single solidified article.
Figure 2A:
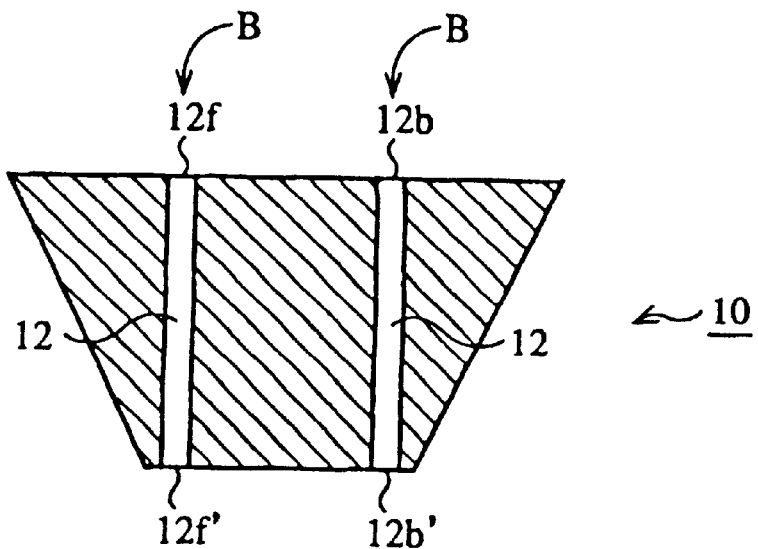
FIG. 2(a) is a longitudinal cross-sectional view of the porous nozzle of the present invention taken along line 2a—2a in FIGS. 1(a) and 9(a)
Figure 2B:
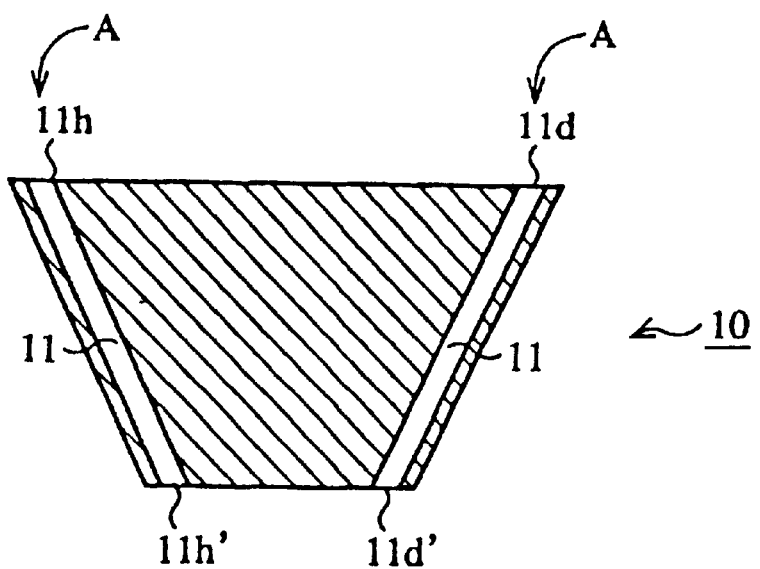
FIG. 2(b) is a longitudinal cross-sectional view of the porous nozzle of the present invention taken along line 2b—2b in FIGS. 1(b) and 9(b).

The molding system of the present invention is used for producing a solidified article, for example, a solidified chocolate, having a predetermined composite pattern formed of two kinds of viscous fluids, for example, liquid chocolate A and B. As shown in FIGS. 1 and 2, the molding system includes a porous nozzle 10 having a plurality of discrete passages 11, 12 (FIGS. 2(a), 2(b)) penetrating therethrough for separately guiding predetermined amount of each of the liquid chocolate A and B which has been measured separately in advance by a depositor (not shown), and a uniting nozzle 20 (FIG. 1(b)) communicating with outlets 11a' to 11h' and 12a' to 12h' of the discrete passages 11, 12 for collecting streams of the liquid chocolate A, B together which have been guided by the discrete passages 11, 12 to further guide the same to a unit mold 30.

The plurality of discrete passages 11 (FIG. 2(b)) penetrating the porous nozzle 10 guide the liquid chocolate A to the unit mold 30, and each of the discrete passages 11 has an inlet 11a to 11h for receiving the liquid chocolate measured by the depositor, and an outlet 11a' to 11h' for simultaneously discharging the liquid chocolate A received through the inlet 11a to 11h to the unit mold 30. On the other hand, the plurality of discrete passages 12 (FIG. 2(a)) penetrating the porous nozzle 10 guide the liquid chocolate B to the unit mold 30, and each of the discrete passages 12 has an inlet 12a to 12h for receiving the liquid chocolate measured by the depositor, and an outlet 12a' to 12h' for simultaneously discharging the liquid chocolate B received through the inlet 12a to 12h to the unit mold 30. The outlets 11a' to 11h' of the discrete passages 11 and the outlets 12a' to 12h' of the discrete passages 12 are arranged alternately in circles in a predetermined plane facing the unit mold 30, through which outlets the liquid chocolate A and B are discharged separately and generally simultaneously in a predetermined state. The nozzle for separately guiding each of the liquid chocolate A and B to the unit mold 30 may be a nozzle wherein the liquid chocolate A and B are guided by additional discrete passages branched upstream of the discrete passages 11, 12, or a porous nozzle wherein the discrete passages 11, 12 themselves are branched (FIGS. 3(a) and 3(b)) to be discussed later, in place of the porous nozzle 10.

Figure 4A:
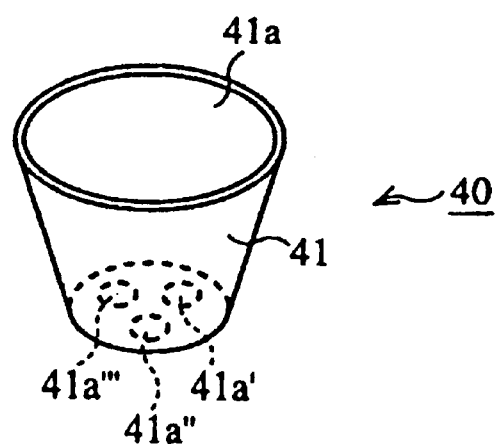
FIGS. 4(a) to 4(c) are schematic perspective views of other embodiments of the uniting nozzle of FIGS. 1(b) and 9(b).
Figure 4B:
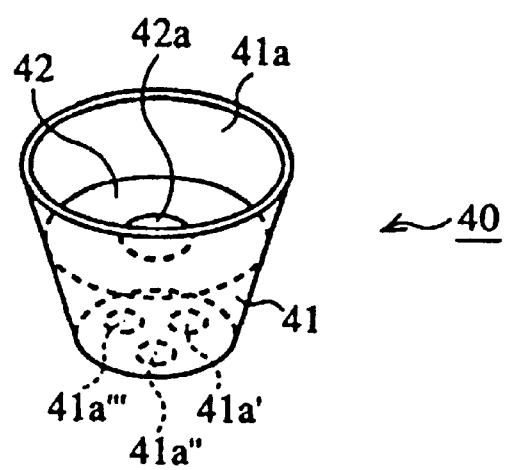
Figure 4C:
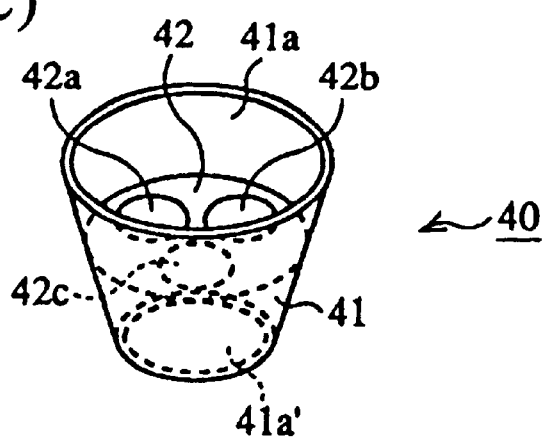

The uniting nozzle 20 communicating with the outlets 11a' to 11h' of the discrete passages 11 and the outlets 12a' to 12h' of the discrete passages 12 has a contour of a reversed truncated cone having a tapered surface as shown in FIG. 1(b). The uniting nozzle 20 receives the streams of the liquid chocolate A, B discharged through the outlets 11a' to 11h' of the discrete passage 11 and the outlets 12a' to 12h' of the discrete passage 12 via an inlet 21a, collects the received streams of the chocolate A, B together by a uniting passage 21, and discharges the chocolate A, b through an outlet 21a' provided at the lower end of the uniting nozzle 20, thereby guiding the chocolate A, B to the unit mold 30. The uniting nozzle for collecting the streams of the chocolate A, B together for guiding the same to the unit mold 30 may be other uniting nozzles 40 as shown in FIGS. 4(a) to 4(c) to be discussed later, in place of the uniting nozzle 20. By the uniting nozzle, the streams of the liquid chocolate A, B discharged from the porous nozzle 10 in a predetermined state may be merged into a predetermined collected state, or into a predetermined suitably mixed state for discharging therefrom.

As explained above, according to the molding system of the present invention, each of the liquid chocolate A, B measured in advance by the depositor (not shown) is received by the porous nozzle 10 through the inlets 11a to 11h of the discrete passages 11 and the inlets 12a to 12h of the discrete passages 12, and discharged through the plurality of outlets 11a' to 11h' and 12a' to 12h' arranged alternately in circles in the predetermined plane facing the unit mold 30. The streams of the discharged chocolate A, B are collected together by the uniting passage 21 of the uniting nozzle 20, and guided to an accommodating portion of the unit mold 30.

For producing a solidified article, for example, a solidified chocolate, having a predetermined composite pattern formed of two kinds of viscous fluids, for example, liquid chocolate A, B, using the above molding system, first predetermined amounts of each of the liquid chocolate A, B are separately measured by a depositor (not shown), separately guided through the discrete passages 11, 12 of the porous nozzle 10, discharged through the outlets 11a' to 11h' of the discrete passages 11 and the outlets of 12a' to 12h' of the discrete passages 12 arranged alternately in circles in the predetermined plane facing the unit mold 30. The streams of the discharged chocolate A, B are collected together by the uniting passage 21 of the uniting nozzle 20, guided to the accommodating portion 31 of the unit mold 30, and molded and solidified in the unit mold 30, thereby producing the solidified chocolate (a solidified article) having a predetermined composite pattern. In molding and solidifying the chocolate A, B in the above process, a cooling machine may additionally be used, or a heating machine may also be used depending on the viscous fluid to be molded and solidified.

According to the present invention, the uniting nozzle 20 of the present embodiment may be eliminated in practice. In this alternate embodiment, mingling of the composite pattern formed of the two liquid chocolate A, B may be reduced. In producing a solidified chocolate having a predetermined composite pattern with the molding system of the present invention which is not equipped with the uniting nozzle 20, like the process as described above, first predetermined amounts of each of the liquid chocolate A, B are separately measured by a depositor (not shown), separately guided through the discrete passages 11, 12 of the porous nozzle 10, and discharged through the outlets 11a' to 11h' of the discrete passages 11 and the outlets of 12a' to 12h' of the discrete passages 12 arranged alternately in circles in the predetermined plane facing the unit mold 30 into the accommodating portion 31 of the unit mold 30. The liquid chocolate A, B poured into the accommodating portion 31 of the unit mold 30 is molded and solidified therein, thereby giving a solidified chocolate (solidified article) having a predetermined composite pattern.

In the molding system of the present invention, other porous nozzles 10 as shown in FIGS. 3(*a*) and 3(*b*) may be used in place of the porous nozzle 10 in FIG. 1(*a*). The porous nozzle 10 shown in FIG. 3(*a*) is provided with a surrounding wall 13 disposed radially outwardly of and surrounding the inlets 11*a* to 11*h* of the discrete passages 11 (corresponding to the discrete passages 11 in FIG. 2(*b*)), and a surrounding wall 14 disposed radially inwardly of the inlets 11*a* to 11*h* of the discrete passages 11 (corresponding to the discrete passages 11 in FIG. 2(*b*)) and radially outwardly of and surrounding the inlets 12*a* to 12*h* of the discrete passages 12 (corresponding to the discrete passages 12 in FIG. 2(*a*)). With the porous nozzle 10 (FIG. 3(*a*)), each of the liquid chocolate A, B may be separately introduced into areas defined by the surrounding walls 13, 14, respectively, so that the liquid chocolate A, B may be received through the respective inlets 11*a* to 11*h* and 12*a* to 12*h* of the discrete passages, and discharged through the outlets 11*a'* to 11*h'* and 12*a'* to 12*h'*.

The porous nozzle 10 in FIG. 3(*b*) is provided with a discrete passage 11 (corresponding to the discrete passage 11 in FIG. 2(*b*)) branched in the middle and having a single inlet 11' and a plurality of outlets 11*a'* to 11*h'*, and a discrete passage 12 (corresponding to the discrete passage 12 in FIG. 2(*a*)) branched in the middle and having a single inlet 12' and a plurality of outlets 12*a'* to 12*h'*. With the porous nozzle 10 (FIG. 3(*b*)), each of the liquid chocolate A, B may be introduced into the single inlet 11', 12' of each of the discrete passages, respectively, so that the liquid chocolate may be discharged in a predetermined state through the outlets 11*a'* to 11*h'* and 12*a'* to 12*h'*.

In the molding system of the present invention, other uniting nozzles 40 as shown in FIGS. 4(*a*) to 4(*c*) may be used in place of the uniting nozzle 20 in FIG. 1(*b*). The uniting nozzle 40 as shown in FIG. 4(*a*) is provided with a uniting passage 41 having a single inlet 41*a* and three outlets 41*a'*, 41*a"*, 41''', so that it functions to receive the streams of the liquid chocolate A, B (viscous fluids) discharged from the porous nozzle 10 through the inlet 41*a*, and merge the streams before they are discharged. Therefore, a solidified chocolate (solidified article) having a suitably mingled predetermined composite pattern may be produced.

The uniting nozzle 40 in FIG. 4(*b*) is a modified embodiment of the uniting nozzle 40 in FIG. 4(*a*), wherein the uniting nozzle is provided with a plate 42 having an orifice 42*a*, disposed in the middle of the uniting passage 41 of the uniting nozzle in a plane transverse to a flow direction of the liquid chocolate A, B (viscous fluid) through the uniting passage. This uniting nozzle 40 functions to collect the streams of the chocolate A, B (viscous fluids) discharged through the outlets 11*a'* to 11*h'* and 12*a'* to 12*h'* of the porous nozzle 10 together, merges the streams, and wring out the merged streams of the liquid chocolate. Thus, a solidified chocolate (solidified article) having a predetermined composite pattern suitably mingled to a predetermined degree can be produced.

The uniting nozzle 40 as shown in FIG. 4(*c*) is a modified embodiment of the uniting nozzle 20 in FIG. 1(*b*) where in the uniting nozzle is provided with a plate 42 having a plurality of orifices 42*a* to 42*c* (three orifices are shown in the drawings), disposed in the middle of the uniting passage 41 of the uniting nozzle in a plane transverse to a flow direction of the liquid chocolate A, B through the uniting passage. The streams of the liquid chocolate A, B discharged from the porous nozzle 10 through the outlets 11*a'* to 11*h'* and 12*a'* to 12*h'* is received through the inlet 41*a*, collected together, passed through the orifices 42*a* to 42*c* disposed in the middle of the passage, and discharged through the outlet 41*a'* Thus, the streams of the liquid chocolate A, B (a plurality of viscous fluids) discharged from the discrete passages 11, 12 through the outlets 11*a'* to 11*h'* and 12*a'* to 12*h'* may be merged to a desired extent and discharged in a predetermined state, thereby giving a solidified chocolate (solidified article) having a predetermined composite pattern suitably mingled to a desired extent.

In this Example, the porous nozzle 10 has been described as having the discrete passages 11, 12 for separately guiding each of the liquid chocolate A, B integrally formed therein, but the porous nozzle of the present invention is not limited thereto. For example, the porous nozzle may be an assembly of a plurality of parts such as a nozzle provided with a discrete passage 11 for guiding mainly the liquid chocolate A, and a nozzle provided with a discrete passage 12 for guiding mainly the liquid chocolate B. With this embodiment, a solidified chocolate (a solidified article) having a predetermined composite pattern may be produced simply by arbitrarily combining each parts, and each parts may be detached easily for cleaning, thus being remarkably advantageous.

Further, the number of the outlets of each passage (discrete passages 11, 12 and uniting passage 21) may be decided as desired; the configuration of the outlet may be decided as desired, such as triangle, rectangle, oval, or the like; and the arrangement of the outlets may be decided as desired, for example, the outlets may be arranged alternately in circles, or in a staggered pattern, regularly, or irregularly.

The unit mold used in the present invention may have any shape, such as a shape representing a desired article. Further, the composite pattern to be formed with the solidified chocolate (solidified article) may also be controlled by changing the point in the unit mold 30 on which the liquid chocolate A, B (viscous fluids) falls which is finally discharged through the outlets disposed facing the unit mold 30. Alternatively, the configurations of the porous nozzle provided with the discrete passages and the uniting nozzle provided with the uniting passage is not limited to the reversed truncated cone, and may be any desired shape such as a rectangular parallelepiped.

EXAMPLE 2

Another embodiment of the molding system of the present invention is now described with reference to FIGS. 5 and 6.

This molding system is used for producing a covered solidified chocolate (solidified article) wherein a liquid chocolate C is accommodated in the middle covered with two kinds of liquid chocolate A, B (viscous fluids) forming a predetermined composite pattern therearound. The molding system includes a porous nozzle 50 having a plurality of discrete passages 51 to 53 (FIGS. 6(*a*), 6(*b*)) penetrating therethrough for separately guiding predetermined amount of each of the liquid chocolate A to C which have been measured in advance by a depositor (not shown), and a uniting nozzle 60 (FIG. 5(*b*)) communication with the outlets 51*a'* to 51*h'*, 52*a'* to 52*h'*, 53*a'* of the discrete passages 51 to 53. A unit mold 70 (FIG. 5(*c*)) for forming a single solidified chocolate is used with these nozzles. Timing for discharging each of the liquid chocolate A to C from each of the discrete passages is controlled at the depositor such that discharging of the liquid chocolate A and B from the discrete passages through the outlets 51a' to 51h', 52a' to 52h', respectively, start generally simultaneously, but discharging of the liquid chocolate C through the outlet 53a' starts later and stops earlier than the discharging of the liquid chocolate A and B, and this timing is maintained.

Figure 6A:
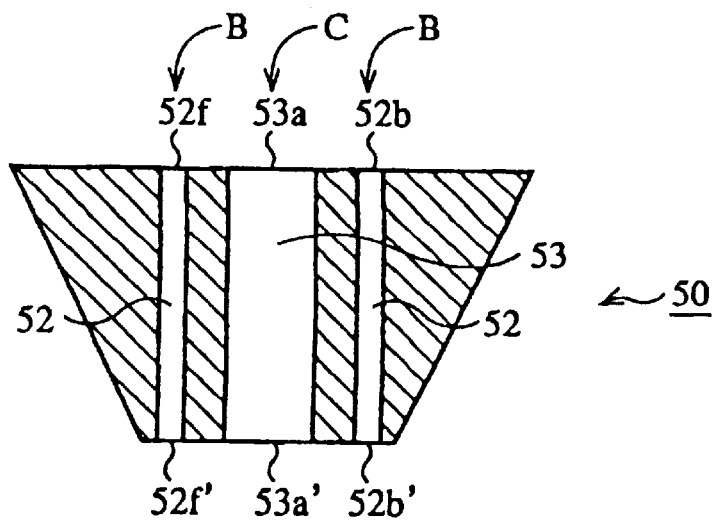
FIG. 6(a) is a longitudinal cross-sectional view of the porous nozzle of the present invention taken along line 6a—6a in FIGS. 5(a) and 10(a)
Figure 6B:
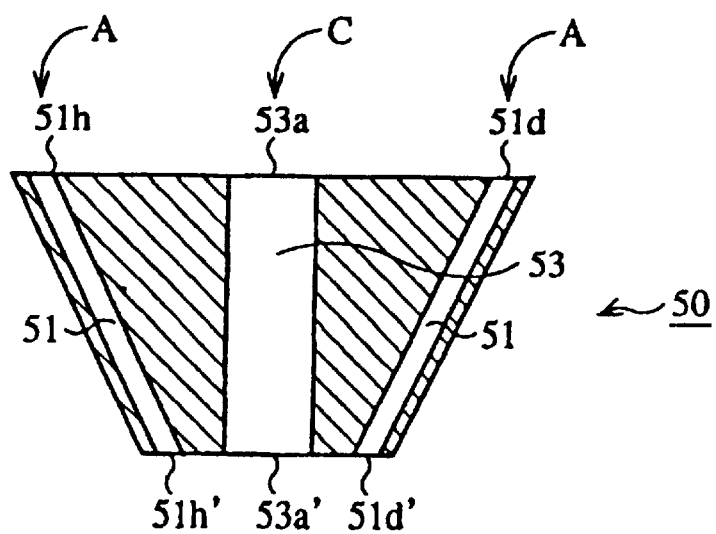
FIG. 6(b) is a longitudinal cross-sectional view of the porous nozzle of the present invention taken along line 6b—6b in FIGS. 5(a) and 10(a).

The plurality of discrete passages 51 (FIG. 6(b)) penetrating the porous nozzle 50 guide the liquid chocolate A to the unit mold 70. The discrete passages 51 are provided with inlets 51a to 51h for receiving predetermined amount of the liquid chocolate A measured by the depositor in advance, and outlets 51a' to 51h' for discharging the liquid chocolate A received through the inlets to the unit mold 70.

The plurality of discrete passages 52 (FIG. 6(a)) penetrating the porous nozzle 50 guide the liquid chocolate B to the unit mold 70 similarly to the discrete passages 51. The discrete passages 52 are provided with inlets 52a to 52h for receiving predetermined amount of the liquid chocolate B measured by the depositor in advance, and outlets 52a' to 52h' for discharging the liquid chocolate B received through the inlets to the unit mold 70.

The outlets 51a' to 51h' of the discrete passage 51, and the outlets 52a' to 52h' of the discrete passage 52 are arranged alternately in circles in a predetermined plane facing the unit mold 70. The single discrete passage 53 penetrating the center of the porous nozzle 50 guides the liquid chocolate C to the unit mold 70, and is provided with an outlet 53a for receiving predetermined amount of the liquid chocolate C measured by a depositor in advance, and an outlet 53a' for discharging the liquid chocolate C received through the inlet 53a to the unit mold 70. With this structure, the liquid chocolate A and B are discharged through the outlets 51a' to 51h' and 52a' to 52h' arranged as desired into the unit mold 70 in a predetermined state, and the liquid chocolate C is discharged into the center of the unit mold 70. The nozzle for separately guiding each of the liquid chocolate A to C to the unit mold 70 may be a nozzle wherein the liquid chocolate A to C are guided by additional discrete passages branched upstream of the discrete passages 51 to 53 of the porous nozzle, or a porous nozzle wherein the discrete passages 51 to 52 themselves are branched (FIGS. 7(a), 7(b)) as to be discussed later, in place of the porous nozzle 50.

Figure 5A:
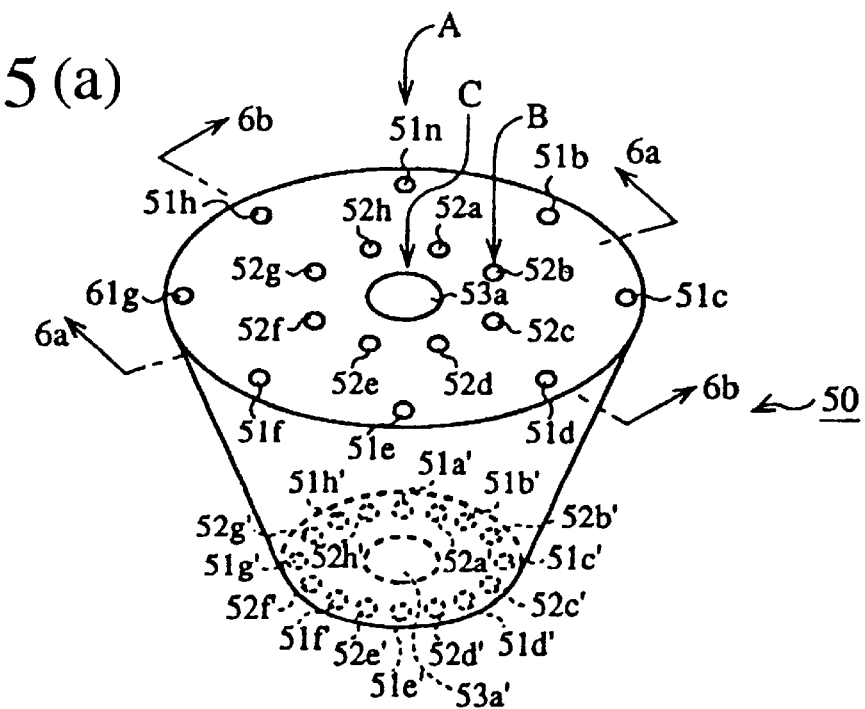
Figure 5B:
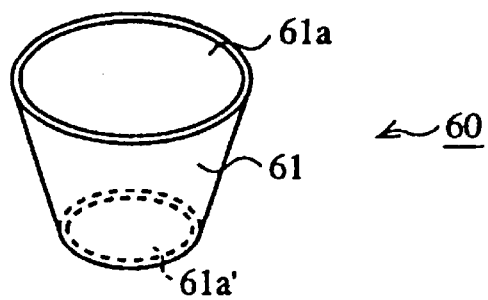
Figure 8A:
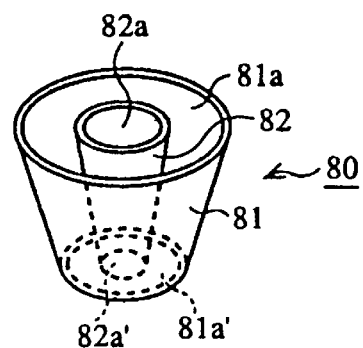
FIGS. 8(a) and 8(b) are schematic perspective views of other embodiments of the uniting nozzle of FIGS. 5(b) and 10(b).
Figure 8B:
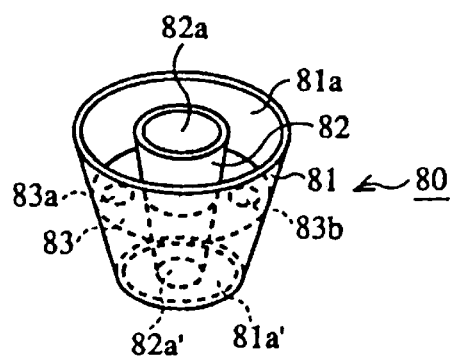

The uniting nozzle 60 communicating with the outlets 51a' to 51h', 52a' to 52h', 53a' of the discrete passages 51 to 53 has a contour of a reversed truncated cone having a tapered surface as shown in FIG. 5(b). The uniting nozzle 60 receives the streams of the liquid chocolate A to C discharged from the discrete passages 51 to 53 through the outlets 51a' to 51h', 52a' to 52h', 53a' via an inlet 61a, collects the received streams of the chocolate A to C together by a uniting passage 61, and discharge the chocolate A to C through an outlet 61a' provided at the lower end of the uniting nozzle 60, thereby guiding the chocolate A to C to the unit mold 70. The uniting nozzle for guiding the liquid chocolate A to C discharged from the porous nozzle to the unit mold 70 may be other uniting nozzles 80 as shown in FIGS. 8(a), 8(b) to be discussed later, in place of the uniting nozzle 60. By the uniting nozzle, the streams of the liquid chocolate A to C discharged from the porous nozzle 50 in a predetermined state may be merged into a predetermined collected state for discharging therefrom.

In molding the liquid chocolate A to C in the unit mold 70 in this Example, discharge of the liquid chocolate C is controlled to start later and stop earlier than the discharge of the liquid chocolate A and B, so that previously discharged liquid chocolate A and B first cover the bottom portion of the accommodating portion 71 of the unit mold 70 (the top portion when the article is demolded) and the vicinity thereof, and then the liquid chocolate C is discharged on and in the center of the previously covered portion. The liquid chocolate C is finally covered by the liquid chocolate A and B.

As described above, according to the molding system of the present invention, the predetermined amount of liquid chocolate A to C measured by the depositor (not shown ) in advance are separately received through the inlets 51a to 51h, 52a to 52h, 53a of the discrete passages 51 to 53 of the porous nozzle 50, discharged through the plurality of outlets 51a' 51h', 52a' to 52h', 53a' arranged alternately in circles in the predetermined plane facing the unit mold 70. The streams of the liquid chocolate A to C discharged from the porous nozzle 50 are then collected together by a uniting nozzle 60, and guided to the accommodating portion 71 of the unit mold 70.

In producing a covered solidified chocolate (solidified article) having the liquid chocolate C accommodated inside and the predetermined composite pattern formed of the two kinds of liquid chocolate A, B (viscous fluids) covering the liquid chocolate C with the molding system described above, first predetermined amounts of each of the liquid chocolate A to C are separately measured by a depositor (not shown). Then each of the predetermined amount of the liquid chocolate A and B is guided by the discrete passages 51 and 52, respectively, so that the liquid chocolate A and B are discharged through the outlets 51a' to 51h', and 52a' to 52h', respectively, arranged alternately in circles in the predetermined plane facing the unit mold 70, into the inner surface of the accommodating portion 71 of the unit mold 70, and the predetermined amount of the liquid chocolate C is guided by the discrete passage 53, so that the liquid chocolate C is discharged through the outlet 53a' surrounded by the outlets 51a' to 51h' and 52a' to 52h' and placed in the center thereof into approximately the center of the accommodating portion 71 of the unit mold 70. In this process, the discharge of the liquid chocolate C is controlled to start later and stop earlier than the discharge of the liquid chocolate A and B. The streams of the liquid chocolate A and B discharged through the outlets 51a' to 51h' and 52a' to 52h' arranged alternately in circles and the stream of the liquid chocolate C discharged through the outlet 53a' surrounded by the outlets 51a' to 51h' and 52a' to 52h' are collected together by the uniting nozzle 60, and guided to the accommodating portion 71 of the unit mold 70 to mold and solidify the liquid chocolate A to C, thereby producing the covered solidified chocolate (covered solidified article) having the predetermined composite pattern. In molding and solidifying the liquid chocolate A to C in the above process, a cooling machine may additionally be used, or a heating machine may also be used depending on the viscous fluid to be molded and solidified.

Figure 7A:
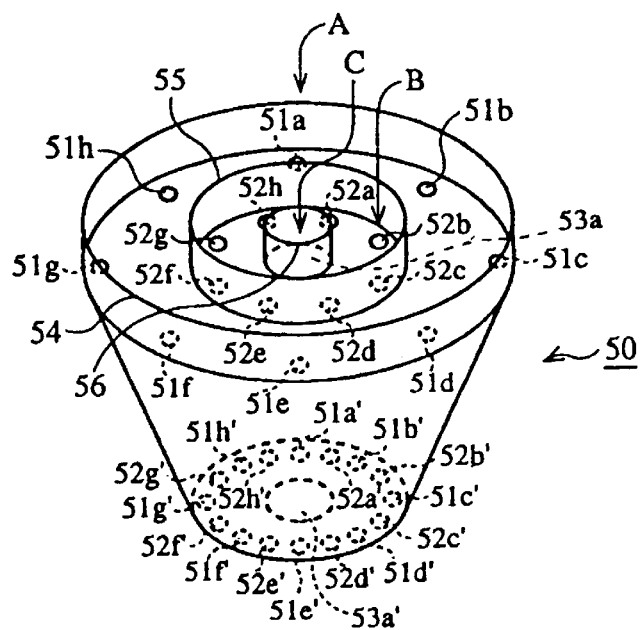
FIGS. 7(a) and 7(b) are schematic perspective views of other embodiments of the porous nozzle of FIGS. 5(a) and 10(a).
Figure 7B:
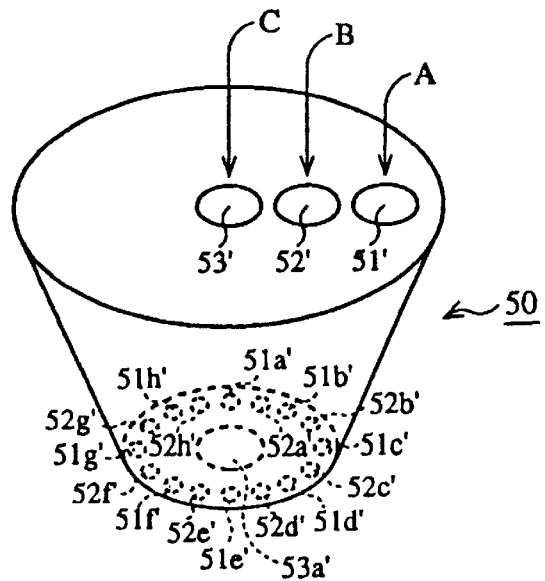

In the molding system of the present invention, the porous nozzle 50 (FIG. 5(a)) may be replace by other porous nozzles 50 as shown in FIGS. 7(a) and 7(b). The porous nozzle 50 as shown in FIG. 7 (a) is provided with a surrounding wall 54 disposed radially outwardly of and surrounding the inlets 51a to 51h of the discrete passages 51 (corresponding to the discrete passages 51 in FIG. 6(b)), a surrounding wall 55 disposed radially inwardly of the inlets 51a to 51h of of the discrete passages 51 (corresponding to the discrete passages 51 in FIG. 6(b)) and radially outwardly of and surrounding the inlets 52a to 52h of the discrete passages 52 (corresponding to the discrete passages 52 in FIG. 6(*a*)), and a surrounding wall 56 disposed radially inwardly of the inlets 52*a* to 52*h* of the discrete passage 52 (corresponding to the discrete passage 52 in FIG. 6(*a*)) and radially outwardly of and surrounding the inlet 53*a* of the discrete passage 53. With the porous nozzle 50 (FIG. 7(*a*)), each of the liquid chocolate A to C may be separately introduced into areas defined by the surrounding walls 54 to 56, respectively, so that the liquid chocolate A to C may be received through the respective inlets 51*a* to 51*h*, 52*a* to 52*h*, and 53*a* of the discrete passages, and discharged through the outlets 51*a*' to 51*h*', 52*a*' 52*h*', and 53*a*'.

The porous nozzle 50 as shown in FIG. 7(*b*) is provided with a discrete passage 51 (corresponding to the discrete passages 51 in FIG. 6(*b*)) having a single inlet 51' and a plurality of outlets 51*a*' to 51*h*' and branched in the middle, a discrete passage 52 (corresponding to the discrete passages 52 in FIG. 6(*a*)) having a single inlet 52' and a plurality of outlets 52*a*' to 52*h*' and branched in the middle, and a discrete passage 53 (corresponding to the discrete passage 53 in FIGS. 6(*a*) and 6(*b*)) having a single inlet 53*a* and a single outlet 53*a*'. With the porous nozzle (FIG. 7(*b*)), each of the liquid chocolate A to C may be introduced through the single inlet 51', 52', 53', respectively, of each of the discrete passages, and discharged through the outlets 51*a*' to 51*h*', 52*a*' 52*h*', and 53*a*', respectively.

Figure 5C:
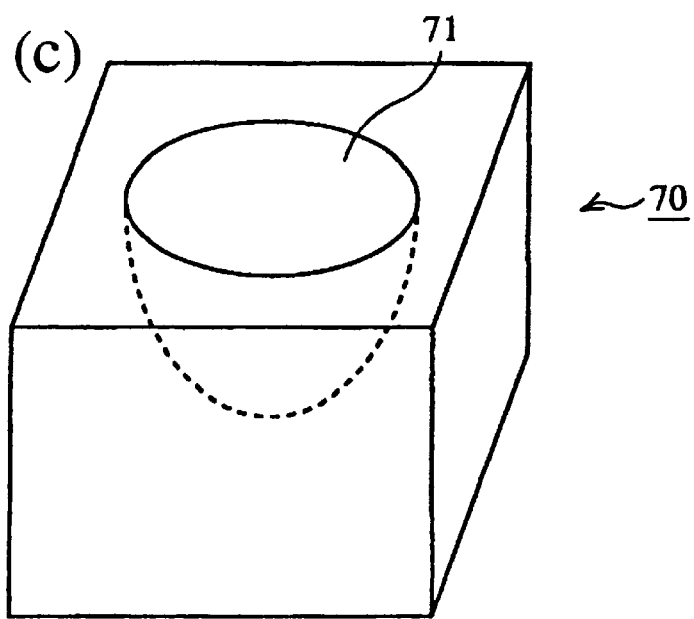
FIG. 5(c) is a schematic perspective view of another example of the unit mold for forming a single solidified article.

Further, in the molding system of the present invention, the above mentioned uniting nozzle 60 (FIG. 5(*b*)) may be replaced by other uniting nozzles 80 as shown in FIGS. 8(*a*) and 8(*b*). The uniting nozzle 80 as shown in FIG. 8(*a*) is provided with a uniting passage 81 defined between two coaxially disposed inner and outer cylinders having radially inwardly tapered surfaces, and communicating with the outlets 51*a*' 51*h*', 52*a*' to 52*h*' of the discrete passages 51, 52 of the porous nozzle 50 in FIGS. 5(*a*), 6(*a*), and 6(*b*), and a discrete passage 82 defined by the inner cylinder, and communicating with the outlet 53*a*' of the discrete passage 53 of the porous nozzle 50. The uniting passage 81 receives through the inlet 81*a* streams of the liquid chocolate A and B discharged through the outlets 51*a*' to 51*h*', 52*a*' to 52*h*' of the discrete passages 51, 52 of the porous nozzle 50, collects them, and discharge the same through the outlet 81*a*'. On the other hand, the discrete passage 82 receives through the inlet 82*a* a stream of the liquid chocolate C discharged through the outlet 53*a*' of the discrete passage 53 of the porous nozzle 50, and discharge the same as it is through the outlet 82*a*'. As mentioned above, timing for discharging each of the liquid chocolate A to C from the outlets 81*a*', 82*a*' is controlled such that discharging of the liquid chocolate C via the discrete passage 53 of the porous nozzle 50 through the outlet 82*a*' of the discrete passage 82 of the uniting nozzle 80 starts later and stops earlier than the discharging of the liquid chocolate A and B via the discrete passages 51, 52 of the porous nozzle 50 through the outlet 81*a*' of the uniting passage 81 of the uniting nozzle 80. With the uniting nozzle 80 (FIG. 8(*a*)), the liquid chocolates A to C can be poured into the unit mold so that the liquid chocolate C is accommodated inside and surrounded by the liquid chocolate A and B, while the streams of the liquid chocolate A and B are collected together into a predetermined state. Accordingly, the covered solidified chocolate wherein the liquid chocolate C is accommodated in the middle covered with two kinds of liquid chocolate A and B forming a predetermined composite pattern therearound can accurately be produced.

The uniting nozzle 80 as shown in FIG. 8(*b*) is a modification of the uniting nozzle 80 as shown in FIG. 8(*a*) wherein a plate 83 having orifices is provided in the middle of the uniting passage 81 in a plane transverse to the flow direction of the liquid chocolate A, B (viscous fluids) through the uniting nozzle 80. The streams of the liquid chocolate A and B discharged from the discrete passages 51, 52 of the porous nozzle 50 through the outlets 51*a*' to 51*h*', 52*a*' to 52*h*' are received through the inlet 81*a*, collected together, and passed through the plurality of orifices (e.g. 83*a*, 83*b*) of the plate 83. Further, the streams of the liquid chocolate passed through the plurality of orifices are merged again, and discharged through the outlet 81*a*'. The timing of discharge of the liquid chocolate A to C is the same as formerly described with reference to the uniting nozzle 80 as shown in FIG. 8(*a*). With the uniting nozzle 80 (FIG. 8(*b*)), the liquid chocolates A to C can be poured into the unit mold so that the liquid chocolate C is accommodated inside and surrounded by the liquid chocolate A and B, while the streams of the liquid chocolate A and B are collected together into a predetermined state. Accordingly, the covered solidified chocolate wherein the liquid chocolate C is accommodated in the middle covered with two kinds of liquid chocolate A and B forming a predetermined composite pattern therearound can be produced easily and accurately.

In the present Example, the porous nozzle 50 has been described as having the discrete passages 51 to 53 for separately guiding each of the liquid chocolate A to C integrally formed therein, but the porous nozzle of the present invention is not limited thereto. For example, the porous nozzle may be an assembly of a plurality of parts such as a nozzle provided with a discrete passage 51 for guiding mainly the liquid chocolate A, a nozzle provided with a discrete passage 52 for guiding mainly the liquid chocolate B, and a nozzle provided with a discrete passage 53 for guiding mainly the liquid chocolate C. With this embodiment, a covered solidified chocolate (a solidified article) having a predetermined composite pattern may be produced simply by arbitrarily combining each parts, and each parts may be detached easily for cleaning, thus being remarkably advantageous.

Further, the number of the outlets of each passage (discrete passages 51 to 53, 82 and uniting passage 61, 81) may be decided as desired; the configuration of the outlet may be decided as desired, such as triangle, rectangle, oval, or the like; and the arrangement of the outlets may be decided as desired, for example, the outlets may be arranged alternately in circles, or in a staggered pattern, regularly, or irregularly.

The unit mold used in the present invention may have any shape, such as a shape representing a desired article. Further, the composite pattern to be formed with the solidified chocolate (solidified article) may also be controlled by changing the point in the unit mold on which the liquid chocolate A to C (viscous fluids) falls which is finally discharged through the outlets disposed facing the unit mold. Alternatively, in the porous nozzle 50, the discrete passage 53 may be branched, and a portion of the liquid chocolate guided by the discrete passage 53 may be discharged for use as the viscous fluid for forming the composite pattern. Further, the configurations of the porous nozzle provided with the discrete passages and the uniting nozzle provided with the discrete passage and the uniting passage are not limited to the reversed truncated cone, and may be any desired shape such as a rectangular parallelepiped.

EXAMPLE 3

Figure 9A:
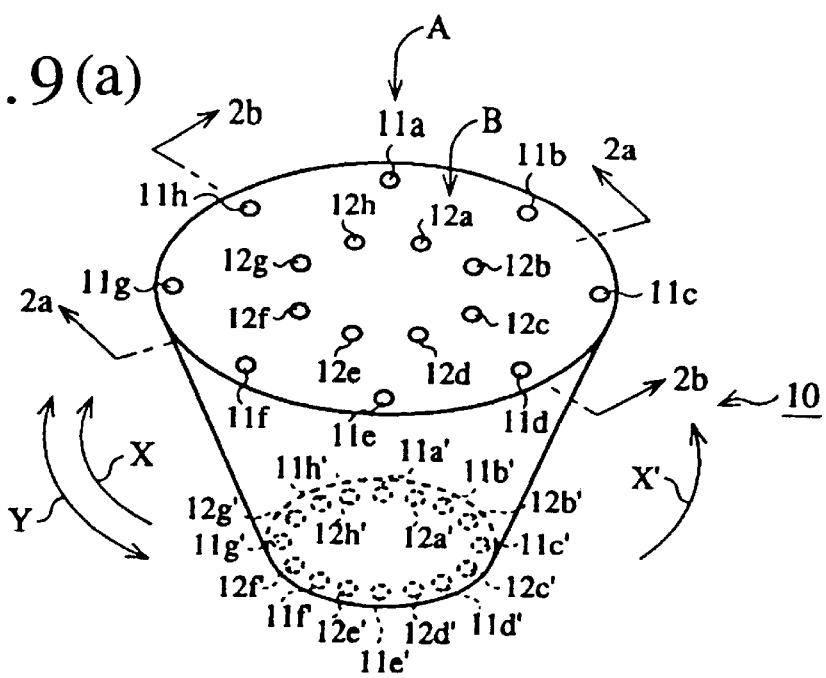
FIG. 9(a) shows an embodiment of the porous nozzle.

An apparatus for producing solidified articles having a predetermined composite pattern is now described with reference to FIG. 9, wherein a predetermined amount of the liquid chocolate (viscous fluids) is intermittently supplied. This apparatus is used for producing solidified chocolates (solidified articles) having a suitably mingled predetermined composite pattern formed of the liquid chocolate A, B (viscous fluids) distinct from each other at least in color. The apparatus is mainly composed of: a depositor (not shown) for intermittently supplying a predetermined amount of the liquid chocolate A, B; a porous nozzle 10 provided with a plurality of discrete passages 11, 12 for separately guiding each of the liquid chocolate A, B; a uniting nozzle 20 provided with a uniting passage 21 communicating with the discrete passages 11, 12, collecting the streams of the liquid chocolate A, B guided by the discrete passages 11, 12, and intermittently discharging a predetermined amount of the liquid chocolate A, B; and a conveyer 30' for receiving and transferring the predetermined amount of the liquid chocolate A, B intermittently discharged from the outlet 21a' of the uniting passage 21. In this embodiment, there is also provided a mechanism for rotatably driving the porous nozzle 10 and/or uniting nozzle 20 in one direction such as clockwise as shown by the arrow X, or counterclockwise as shown by the arrow X', or in reciprocating rotation as shown by the arrow Y in FIGS. 9(a) and 9(b), around an axis perpendicular to the plane wherein outlets 11a' to 11h' and 12a' to 12h' to be described later are arranged.

A plurality of discrete passages 11 (FIG. 2(b)) penetrating the porous nozzle 10 guide the liquid chocolate A, and have inlets 11a to 11h for receiving the predetermined amount of the liquid chocolate A measured in advance by the depositor, and outlets 11a' to 11h' for discharging the received liquid chocolate A. On the other hand, a plurality of discrete passages 12 (FIG. 2(a)) penetrating the porous nozzle 10 guide the liquid chocolate B, and have inlets 12a to 12h for receiving the predetermined amount of the liquid chocolate B measured in advance by the depositor, and outlets 12a' to 12h' for discharging the received liquid chocolate B. The outlets 11a' to 11h' of the discrete passages 11 and the outlets 12a' to 12h' of the discrete passages 12 are arranged alternately in circles in a predetermined plane facing the conveyer 30', and separately discharge the liquid chocolate A and B, respectively, in a predetermined state approximately simultaneously. The porous nozzle for separately guiding each of the liquid chocolate A, B may be a nozzle wherein the liquid chocolate A and B are separately guided by additional discrete passages branched upstream of the discrete passages 11, 12, or a porous nozzle wherein the discrete passages 11, 12 themselves are branched (FIGS. 3(a) and 3(b)) as discussed above, in place of the porous nozzle 10.

Figure 9B:
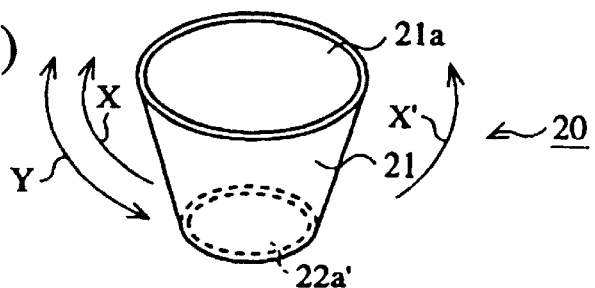
FIG. 9(b) shows an embodiment of the uniting nozzle.
Figure 9C:
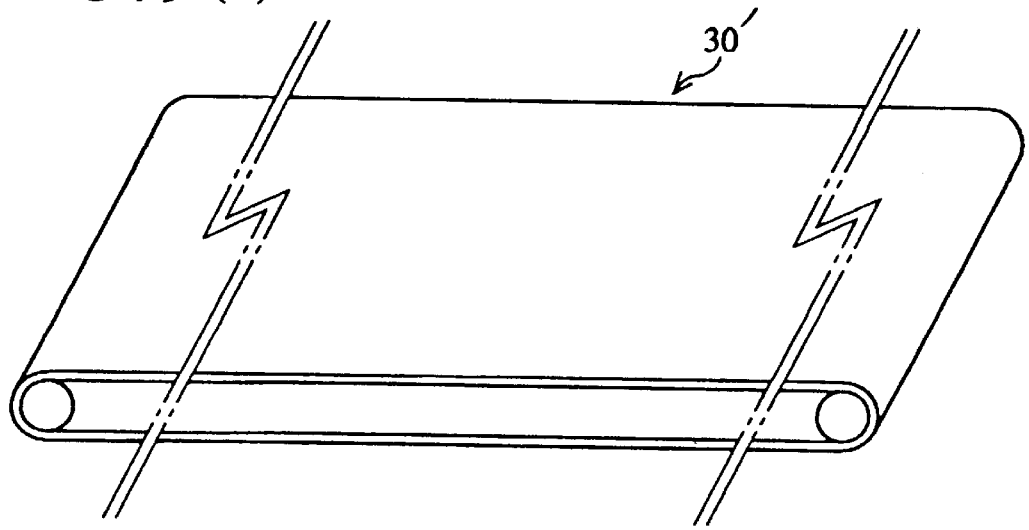
FIG. 9(c) shows an example of a belt conveyer.

The uniting nozzle 20 communicating with the outlets 11a' to 11h', 12a' to 12h' of the discrete passages 11, 12 has a contour of a reversed truncated cone having a tapered surface as shown in FIG. 9(b). The streams of the liquid chocolate A, B discharged through the outlets 11a' to 11h', 12a' to 12h' of the discrete passages 11, 12 are received through the inlet 21a, collected together by a uniting passage 21, and discharged through the outlet 21a' disposed at the lower end of the uniting nozzle 20, thereby guiding the liquid chocolate A, B onto the conveyer 30'. The uniting nozzle 20 for collecting together and guiding the streams of the liquid chocolate A, B discharged from the porous nozzle may be other uniting nozzles described above as shown in FIGS. 4(a) to 4(c). With the uniting nozzle, the streams of the liquid chocolate A, B discharged through the porous nozzle 10 may be collected together and merged and discharged in a predetermined state.

As described above, in the apparatus for producing the solidified articles, the predetermined amount of the liquid chocolate A, B measured in advance by a depositor and intermittently supplied is separately received through the inlets 11a to 11h, 12a to 12h of the discrete passages 11, 12, and discharged through the plurality of outlets 11a' to 11h', 12a' to 12h' arranged alternately in circles in the predetermined plane facing the conveyer 30'. The streams of the liquid chocolate A, B discharged are collected together by a uniting passage 21 of the uniting nozzle 20, and then guided onto the conveyer 30'.

In producing solidified chocolates (solidified articles) having a suitably mingled predetermined composite pattern formed of two kinds of liquid chocolate A, B (viscous fluids) with the above apparatus, first, predetermined amount of each of the liquid chocolate A, B are intermittently supplied by a depositor (not shown), separately guided by the discrete passages 11, 12 of the porous nozzle 10, and discharged through the outlets 11a' to 11h', 12a' 12h' of the discrete passages 11, 12 arranged alternately in circles in a predetermined plane facing the conveyer 30'. The streams of the liquid chocolate A, B discharged through the outlets 11a' to 11h', 12a' to 12h' of the discrete passages 11, 12 are collected together by the uniting passage 21 of the uniting nozzle 20, and guided onto the conveyer 30', where the liquid chocolate A, B is solidified. Thereby a solidified chocolate (a solidified article) having a predetermined mingled composite pattern can be produced. In molding and solidifying the liquid chocolate A, B in the above process, a cooling machine may additionally be used, or a heating machine may also be used depending on the viscous fluid to be molded and solidified. In producing solidified chocolates (solidified articles) with an apparatus of other embodiment of the present invention, the above procedure may be followed in the similar way, and thus the process will not be described in more detail.

Figure 3A:
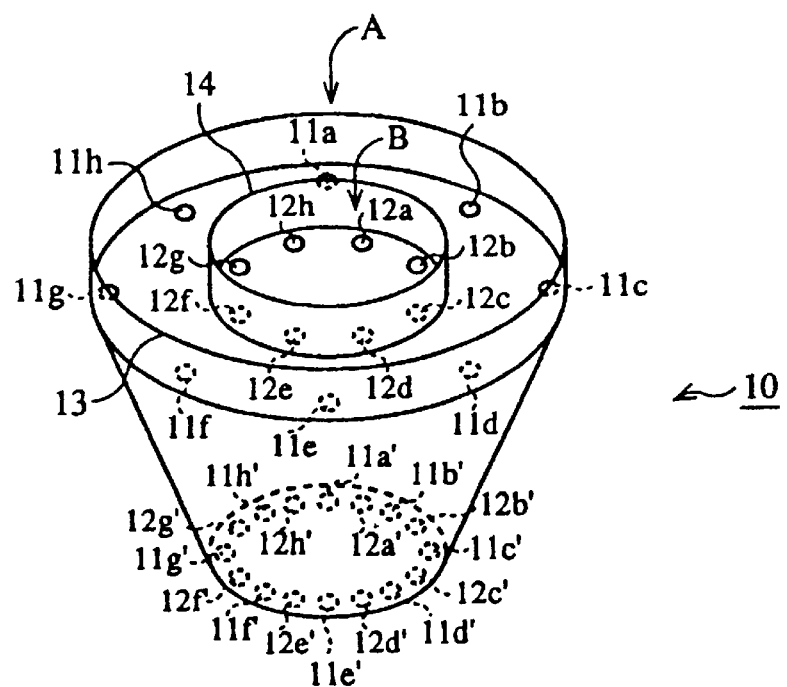
FIGS. 3(a) and 3(b) are schematic perspective views of other embodiments of the porous nozzle of FIGS. 1(a) and 9(a).
Figure 3B:
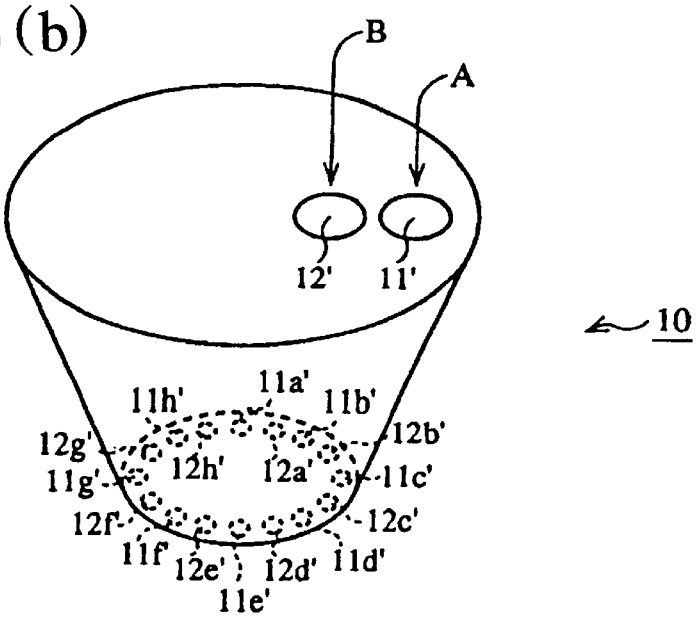

In this apparatus, the porous nozzle 10 (FIG. 9(a)) may be replaced by other porous nozzles 10 described above as shown in FIGS. 3(a) and 3(b). Details of the other porous nozzles 10 as shown in FIGS. 3(a) and 3(b) are as described above, and thus will not be described here.

Further in this apparatus, the uniting nozzle 20 (FIG. 9(b)) may be replaced by other uniting nozzles 40 described above as shown in FIGS. 4(a) to 4(c). Details of the other uniting nozzles 40 as shown in FIGS. 4(a) to 4(c) are as described above, and thus will not be described here.

The apparatus for producing solidified articles having a predetermined composite pattern, wherein predetermined amount of the liquid chocolate (viscous fluids) is intermittently supplied has been described. Next, an apparatus for producing solidified articles having a predetermined composite pattern, wherein the liquid chocolate is continuously supplied at a predetermined ratio will now be described with reference to the drawings.

The apparatus for producing solidified articles may be used for producing solidified chocolates (solidified articles) having a predetermined mingled composite pattern formed of the liquid chocolate A, B (viscous fluids), which liquid chocolates are distinct from each other at least in color. The apparatus is mainly composed of: a pump for high viscosity fluid (not shown) such as a gear pump or a snake pump, for continuously supplying each of the liquid chocolate A, B, at a predetermined ratio; a porous nozzle 10 provided with a plurality of discrete passages 11, 12 for separately guiding each of the liquid chocolate A, B supplied at the predetermined ratio; a uniting nozzle 20 provided with a uniting passage 21 communicating with the discrete passages 11, 12, collecting together the streams of the liquid chocolate A, B received from the porous nozzle 10 to continuously discharge the liquid chocolate at a predetermined ratio; and a conveyer 30 for receiving and transferring the liquid chocolate A, B of the predetermined ratio continuously discharged through the outlet 21a' of the uniting passage 21. In this embodiment, there is also provided, as in the previous embodiment, a mechanism for rotatably driving the porous nozzle 10 and/or uniting nozzle 20 in one direction such as clockwise as shown by the arrow X, or counterclockwise as shown by the arrow X', or in reciprocating rotation as shown by the arrow Y in FIGS. 9(a) and 9(b), around an axis perpendicular to the plane wherein outlets 11a' to 11h' and 12a' to 12h' are arranged.

The plurality of the discrete passages 11 and 12 penetrating the porous nozzle 10 separately guide each of the liquid chocolate A, B. Each of the liquid chocolate A, B is continuously supplied by a pump for high viscosity fluid at a predetermined ratio.

The porous nozzle 10 for separately guiding each of the liquid chocolate A, B to the conveyer 30' may be replaced by a nozzle wherein the liquid chocolate A and B are guided by additional discrete passages branched upstream of the discrete passages 11, 12, or a porous nozzle wherein the discrete passages 11, 12 themselves are branched (FIGS. 3(a) and 3(b)) as described above.

The uniting nozzle 20 (FIG. 9(b)) communicating with the outlets 11a' to 11h', 12a' to 12h' of the discrete passages 11, 12 has the same structure and functions as the uniting nozzle 20 as shown in and described regarding FIG. 1(b). The uniting nozzle 20 (FIG. 9(b)) for collecting together and guiding the streams of the liquid chocolate A, B discharged through the discrete nozzle to the conveyer 30' may be replaced by other uniting nozzles 40 described above and shown in FIGS. 4(a) to 4(c). With the uniting nozzle, the streams of the liquid chocolate A, B discharged through the porous nozzle 10 at the predetermined state may be collected together and merged into a predetermined state for discharging therefrom.

As described above, with the apparatus of the present invention, the liquid chocolate A, B is continuously supplied at a predetermined ratio by a pump for high viscosity fluid (not shown) such as a gear pump or a snake pump, received through the inlets 11a to 11h, 12a to 12h of the discrete passages 11, 12 of the porous nozzle 10, and discharged through the plurality of outlets 11a' to 11h', 12a' to 12h' arranged alternately in circles in a plane facing the conveyer 30'. The streams of the liquid chocolate A, B discharged through the outlets 11a' to 11h', 12a' 12h' are collected together by the uniting passage 21 of the uniting nozzle 20, and guided onto the conveyer 30'.

In producing solidified chocolates (solidified articles) having a predetermined mingled composite pattern formed of two kinds of liquid chocolate A, B (viscous fluids) with the above apparatus, first each of the liquid chocolate is continuously supplied at a predetermined ratio by a pump for high viscosity fluid (not shown), separately guided through each of the discrete passages 11, 12 of the porous nozzle 10, and discharged through the outlets 11a' to 11h', 12a' 12h' of the discrete passages 11, 12 arranged alternately in circles in a predetermined plane facing the conveyer 30'. The streams of the liquid chocolate A, B are collected together by the uniting passage 21 of the uniting nozzle 20, guided onto the conveyer 30', continuously solidified on the conveyer 30', and cut into pieces, thereby producing solidified chocolates (solidified articles) having the predetermined mingled composite pattern.

In molding and solidifying the liquid chocolate A, B in the above process, a cooling machine may additionally be used, or a heating machine may also be used depending on the viscous fluid to be molded and solidified.

In producing the solidified chocolates (solidified articles) with an apparatus of other embodiments of the present invention, the above procedures may be followed. Thus, the process will not be described any further.

In the present apparatus for producing the solidified chocolates, the porous nozzle 10 (FIG. 9(a)) may be replace by other porous nozzles 10 described above and as shown in FIGS. 3(a) and 3(b).

In the present apparatus for producing the solidified chocolates, the uniting nozzle 20 (FIG. 9(b)) may be replace by other uniting nozzles 40 described above and as shown in FIGS. 4(a) to 4(c).

In the Examples, the porous nozzle 10 has been described as having the discrete passages 11, 12 for separately guiding each of the liquid chocolate A, B integrally formed therein, but the porous nozzle of the present invention is not limited thereto. For example, the porous nozzle may be an assembly of a plurality of parts such as a nozzle provided with a discrete passage 11 for guiding mainly the liquid chocolate A, and a nozzle provided with a discrete passage 12 for guiding mainly the liquid chocolate B. With this embodiment, a solidified chocolate (a solidified article) having a predetermined composite pattern may be produced simply by arbitrarily combining each parts, and each parts may be detached easily for cleaning, thus being remarkably advantageous.

Further, the number of the outlets of each passage (discrete passages 11, 12 and uniting passage 21) may be decided as desired; the configuration of the outlet may be decided as desired, such as triangle, rectangle, oval, or the like; and the arrangement of the outlets may be decided as desired, for example, the outlets may be arranged alternately in circles, or in a staggered pattern, regularly, or irregularly.

Figure 11A:
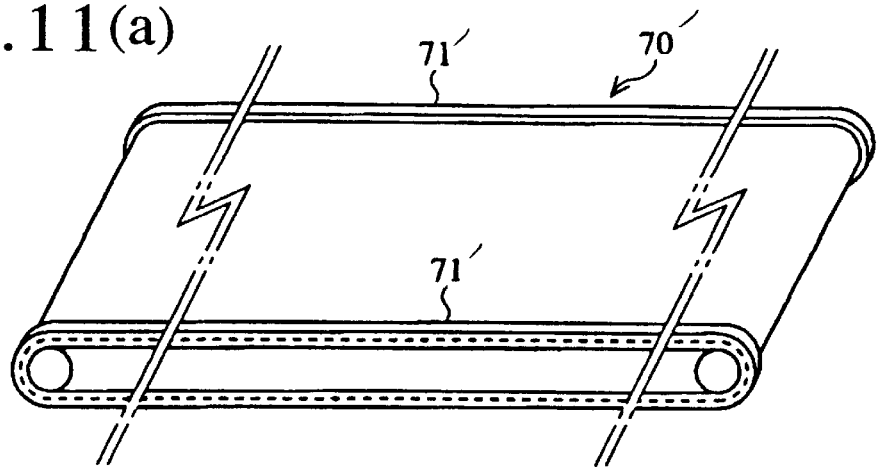
FIGS. 11(a) to 11(c) are schematic perspective views of other embodiments of the conveyers shown in FIGS. 9(c) and 10(c).
Figure 11B:
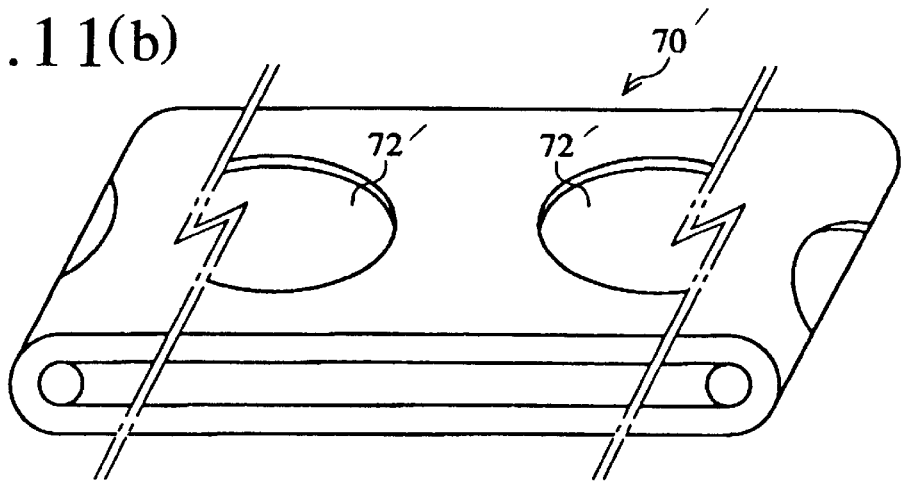
Figure 11C:
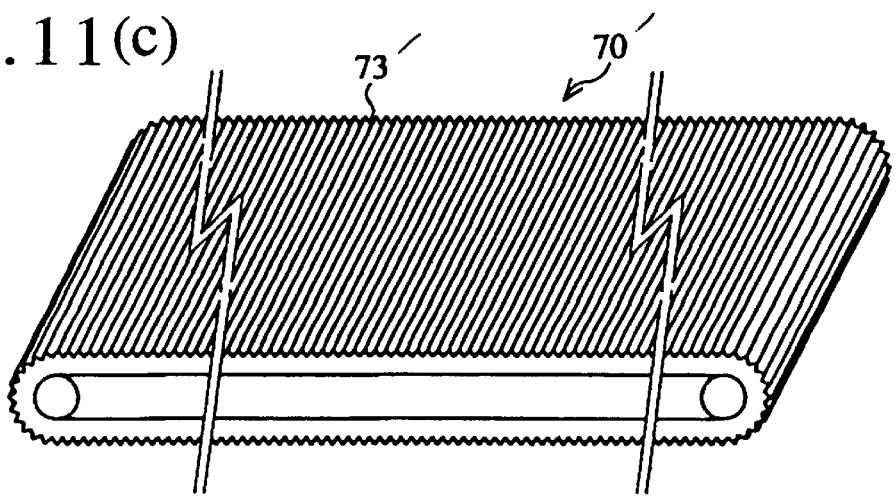

The conveyer employed in the present invention may be a conveyer 70' (FIG. 11(a)) having side walls 71' for preventing fluidization of the liquid chocolate along both sides of the conveyer, a conveyer 70' (FIG. 11(b)) provided with accommodating portions 72' as molds for receiving the liquid chocolate on the conveyer belt, a conveyer 70' (FIG. 11(c)) provided with a belt having concave and convex surface 73, or a conveyer having these structures in arbitrary combination. The accommodating portion 72' may be a mold representing a desired article, or a mold of any configuration.

Further, the composite pattern to be formed with the solidified chocolates (solidified articles) may also be controlled by changing the point in the accommodating portion 72' of the conveyer 70' on which the liquid chocolate A, B (viscous fluids) falls which is finally discharged through the outlets disposed facing the conveyer. Alternatively, the configurations of the porous nozzle provided with the discrete passages and the uniting nozzle provided with the uniting passage is not limited to the reversed truncated cone, and may be any desired shape such as a rectangular parallelepiped.

EXAMPLE 4

Another embodiment of the apparatus of the present invention is described with reference to FIGS. 10 and 6.

First, an apparatus for producing solidified chocolates wherein a predetermined amount of each of the liquid chocolate is intermittently supplied is described with reference to the drawings. The apparatus for producing solidified articles may be used for producing covered solidified chocolates having the liquid chocolate C accommodated inside and the predetermined composite pattern formed of the two kinds of liquid chocolate A, B (viscous fluids) which are distinct from each other at least in color covering the liquid chocolate C. The apparatus is mainly composed of: a depositor (notshown) for intermittently supplying a predetermined amount of the liquid chocolate A to C; a porous nozzle 50 provided with a plurality of discrete passages 51 to 53 for separately guiding each of the liquid chocolate A to C; a uniting nozzle 60 provided with a uniting passage 61 communicating with the discrete passages 51 to 53, collecting the streams of the liquid chocolate A to C guided by the discrete passages 51 to 53, and intermittently discharging a predetermined amount of the liquid chocolate A to C; and a conveyer 30' for receiving and transferring the predetermined amount of the liquid chocolate A to C intermittently discharged from the outlet 61a' of the uniting passage 61. In this embodiment, there is also provided a mechanism for rotatably driving the porous nozzle 50 and/or uniting nozzle 60 in one direction such as clockwise as shown by the arrow X, or counterclockwise as shown by the arrow X', or in reciprocating rotation as shown by the arrow Y in FIGS. 10(a) and 10(b), around an axis perpendicular to the plane wherein outlets 51a' to 51h' and 52a' to 52h' are arranged.

Further, timing for discharging each of the liquid chocolate A to C from each of the discrete passages is controlled at the depositor such that discharging of the liquid chocolate A and B from the discrete passages through the outlets 51a' to 51h', 52a' to 52h' respectively, start generally simultaneously, but discharging of the liquid chocolate C through the outlet 53a' starts later and stops earlier than the discharging of the liquid chocolate A and B, and this timing is maintained.

The plurality of discrete passages 51 (FIG. 6(b)) penetrating the porous nozzle 50 guide the liquid chocolate A. The discrete passages 51 are provided with inlets 51a to 51h of for receiving predetermined amount of the liquid chocolate A measured by the depositor in advance, and outlets 51a' to 51h' for discharging the liquid chocolate A received through the inlets.

The plurality of discrete passages 52 (FIG. 6(a)) penetrating the porous nozzle 50 guide the liquid chocolate B similarly to the discrete passages 51. The discrete passages 52 are provided with inlets 52a to 52h for receiving predetermined amount of the liquid chocolate B measured by the depositor in advance, and outlets 52a' to 52h' for discharging the liquid chocolate B received through the inlets.

The outlets 51a' to 51h' of the discrete passage 51, and the outlets 52a' to 52h' of the discrete passage 52 are arranged alternately in circles in a predetermined plane facing the conveyer 30'. The single discrete passage 53 penetrating the center of the porous nozzle 50 guides the liquid chocolate C, and is provided with an outlet 53a for receiving predetermined amount of the liquid chocolate C measured by a depositor in advance, and an outlet 53a' for discharging the liquid chocolate C received through the inlet 53a to the unit mold 70. With this structure, the liquid chocolate A and B are discharged through the outlets 51a' to 51h' and 52a' to 52h' arranged as desired into the unit mold 70 in a predetermined state, and the liquid chocolate C is discharged into the center thereof. The nozzle for separately guiding each of the liquid chocolate A to C may be a nozzle wherein the liquid chocolate A to C are guided by additional discrete passages branched upstream of the discrete passages 51 to 53 of the porous nozzle, or a porous nozzle wherein the discrete passages 51 to 52 themselves are branched (FIGS. 7(a), 7(b)) as described above, in place of the porous nozzle 50. The uniting nozzle 60 communicating with the outlets 51a' to 51h', 52a' to 52h', 53a' of the discrete passages 51 to 53 has a contour of a reversed truncated cone having a tapered surface as shown in FIG. 5(b).

The uniting nozzle 60 receives the streams of the liquid chocolate A to C discharged from the discrete passages 51 to 53 through the outlets 51a' to 51h', 52a' to 52h', 53a' via an inlet 61a, collects the received streams of the chocolate A to C together by a uniting passage 61, and discharge the chocolate A to C through an outlet 61a' provided at the lower end of the uniting nozzle 60, thereby guiding the chocolate A to C onto the conveyer 30'. The uniting nozzle for guiding the liquid chocolate A to C discharged from the porous nozzle onto the conveyer 30' may be other uniting nozzles 80 as shown in FIGS. 8(a), 8(b) as described above, in place of the uniting nozzle 60. By the uniting nozzle, the streams of the liquid chocolate A to C discharged from the porous nozzle 50 in a predetermined state may be merged into a predetermined collected state for discharging therefrom.

In molding the liquid chocolate A to C in the unit mold 70 in this Example, discharge of the liquid chocolate C is controlled to start later and stop earlier than the discharge of the liquid chocolate A and B, so that the liquid chocolate A and B accommodate and cover the liquid chocolate C, and the liquid chocolate C is finally covered by the liquid chocolate A and B completely on the conveyer 30'.

As described above, according to the apparatus, the predetermined amount of each of the liquid chocolate A to C measured by the depositor (not shown) in advance is intermittently supplied, received separately through the inlets 51a to 51h, 52a to 52h of the discrete passages 51 to 53, discharged through the plurality of outlets 51a' 51h', 52a' to 52h' arranged alternately in circles in a predetermined plane facing the conveyer 30'. The streams of the liquid chocolate A to C are collected by the uniting nozzle 60, and guided onto the conveyer 30'.

In producing the covered solidified chocolate (solidified article) having the liquid chocolate C accommodated inside and the predetermined mingled composite pattern formed of the two kinds of liquid chocolate A, B (viscous fluids) covering the liquid chocolate C with the system described above, first predetermined amounts of each of the liquid chocolate A to C separately measured by a depositor (not shown) is intermittently supplied. Then each of the predetermined amount of the liquid chocolate A to C intermittently supplied is guided by the discrete passages 51 to 53 of the porous nozzle 50, respectively, so that the liquid chocolate A and B are discharged through the outlets 51a' to 51h', and 52a' to 52h', respectively, arranged alternately in circles in the predetermined plane facing the conveyer 30', and the predetermined amount of the liquid chocolate C is guided by the discrete passage 53, so that the liquid chocolate C is discharged through the outlet 53a' surrounded by the outlets 51a' to 51h' and 52a' to 52h' and placed in the center thereof. In this process, the discharge of the liquid chocolate C is controlled to start later and stop earlier than the discharge of the liquid chocolate A and B. The streams of the liquid chocolate A and B discharged through the outlets 51a' to 51h' and 52a' to 52h' arranged alternately in circles and the stream of the liquid chocolate C discharged through the outlet 53a' surrounded by the outlets 51a' to 51h' and 52a' to 52h' are collected together by the uniting nozzle 60, and guided onto the conveyer 30' and solidify the liquid chocolate A to C, thereby producing the covered solidified chocolate (covered solidified article) having the predetermined composite pattern. In molding and solidifying the liquid chocolate A to C in the above process, a cooling machine may additionally be used, or a heating machine may also be used depending on the viscous fluid to be molded and solidified. In producing the covered solidified chocolates (covered solidified articles) with an apparatus of other embodiment of the present invention, the above procedure may be followed. Thus, the process is not described any further.

Figure 10A:
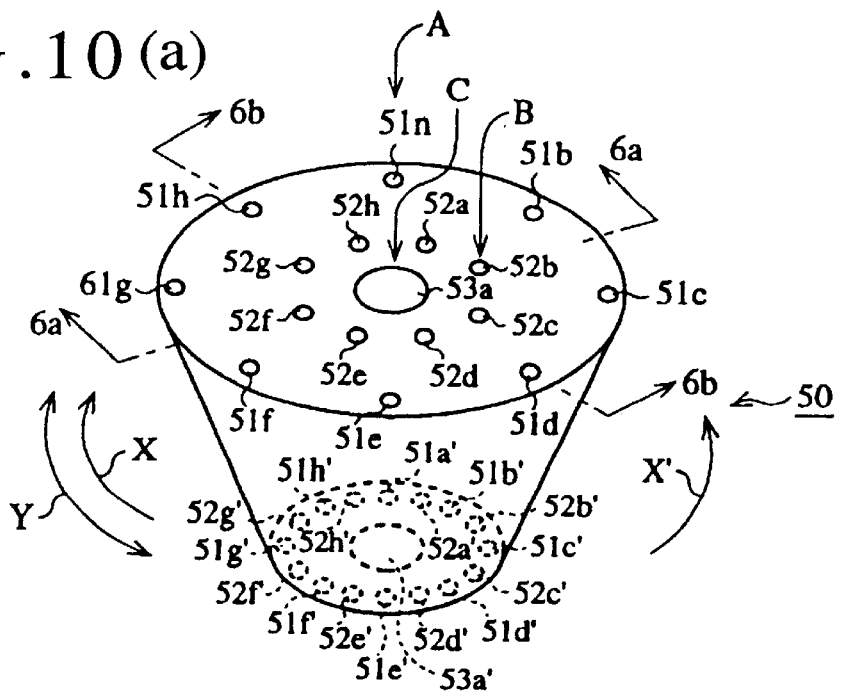
FIG. 10(a) shows another embodiment of the porous nozzle.

In this apparatus, the porous nozzle 50 (FIG. 10(a)) may be replaced by other porous nozzles 50 as shown in FIGS. 7(a) and 7(b) as described above. Details of the other porous nozzles as shown in FIGS. 7(a) and 7(b) are as described above, thus they are not described any further.

Figure 10B:
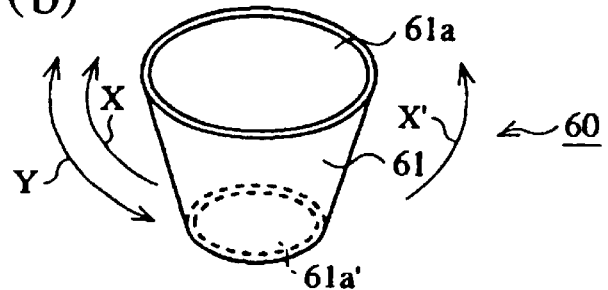
FIG. 10(b) shows another embodiment of the uniting nozzle.
Figure 10C:
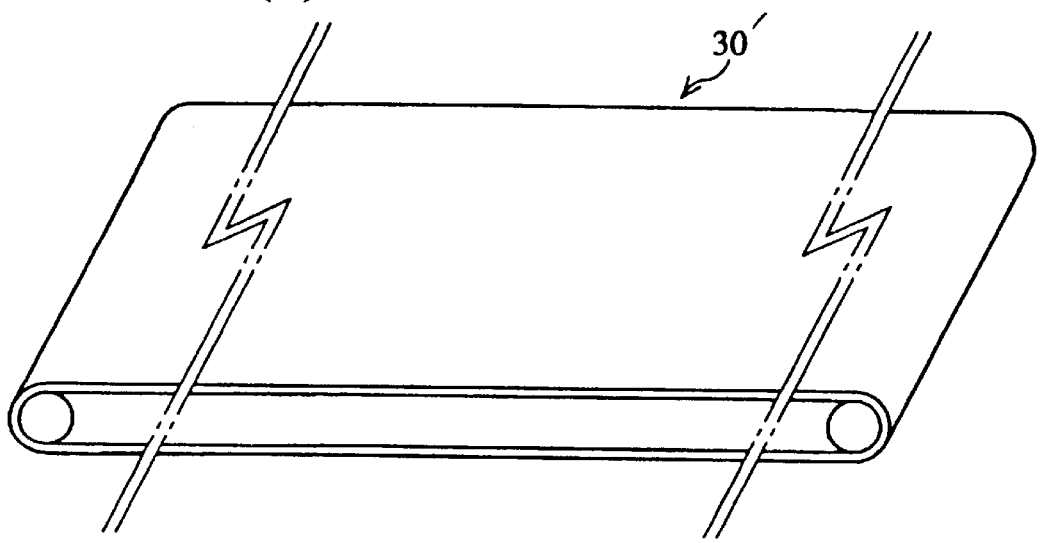
FIG. 10(c) shows another example of a belt conveyer.

Further, the uniting nozzle 60 (FIG. 10(b)) may be replaced by other uniting nozzles 80 as shown in FIGS. 8(a) and 8(b) as described above. Details of the other uniting nozzles are as described above, thus they are not described any further.

The apparatus for producing solidified articles wherein the liquid chocolate is intermittently supplied in a predetermined amount has been described. Next, an apparatus for producing solidified articles wherein the liquid chocolate is continuously supplied in a predetermined ratio will be described with reference to the drawings.

This apparatus for producing solidified articles may be used for producing covered solidified chocolates having the liquid chocolate C longitudinally extending as a central axis and the predetermined composite pattern formed of the two kinds of liquid chocolate A, B (viscous fluids) which are distinct from each other at least in color surrounding the liquid chocolate C. The apparatus is mainly composed of: a pump for high viscosity fluid (not shown) such as a gear pump or a snake pump for continuously supplying the liquid chocolate A to C in a predetermined ratio; a porous nozzle 50 provided with a plurality of discrete passages 51 to 53 for separately guiding each of the liquid chocolate A to C; a uniting nozzle 60 provided with a uniting passage 61 communicating with the discrete passages 51 to 53, collecting the streams of the liquid chocolate A to C guided by the discrete passages 51 to 53, and continuously discharging the liquid chocolate A to C at a predetermined ratio; and a conveyer 30' for receiving and transferring the liquid chocolate A to C continuously discharged at the predetermined ratio from the outlet 61a' of the uniting passage 61. In this embodiment, there is also provided a mechanism for rotatably driving the porous nozzle 50 and/or uniting nozzle 60 in one direction such as clockwise as shown by the arrow X, or counterclockwise as shown by the arrow X', or in reciprocating rotation as shown by the arrow Y in FIGS. 10(a) and 10(b), around an axis perpendicular to the plane wherein outlets 51a' to 51h' and 52a' to 52h' are arranged.

The plurality of discrete passages 51 to 53 (FIGS. 6(a) and 6(b)) penetrating the porous nozzle 50 separately guide each of the liquid chocolate A to C. Each of the liquid chocolate A to C is continuously supplied by a pump for high viscosity fluid at a predetermined ratio. Therefore, each of the liquid chocolate A, B is discharged in a predetermined state through the outlets 51a' to 51h', 52a' to 52h' arranged in a desired arrangement onto the conveyer 30', while the liquid chocolate C is discharged through the outlet 53a' so that it extends longitudinally as a central axis surrounded by the liquid chocolate A, B.

The porous nozzle for separately guide each of the liquid chocolate A to C may be a nozzle wherein the liquid chocolate A to C are guided by additional discrete passages branched upstream of the discrete passages 51 to 53, or a porous nozzle wherein the discrete passages 51 to 53 themselves are branched (FIGS. 7(a) and 3(b)) as described above, in place of the porous nozzle 50.

The uniting nozzle 60 communicating with the outlets 51a' to 51h', 52a' to 52h' of the discrete passages 51 to 53 are the same as described above. The uniting nozzle 60 for guiding the liquid chocolate A to C discharged through the porous nozzle onto the conveyer 30' may be replaced by other nozzles 80 as shown in FIGS. 8(a) and 8(b) as described above. With the uniting nozzle, the streams of the liquid chocolate A to C may be collected together and merged in to a predetermined state for discharging therefrom.

In this embodiment, the liquid chocolate A to C is poured onto the conveyer 30' so that the liquid chocolate C is surrounded by the liquid chocolate A and B to finally surround the liquid chocolate C extending longitudinally as a central axis by the liquid chocolate A and B on the conveyer 30'.

As described above, according to the apparatus of the above embodiment, each of the liquid chocolate A to C continuously supplied in a predetermined ratio by a pump for high viscosity fluid (not shown) such as a gear pump or a snake pump is received through the inlets 51a to 51h, 52a to 52h of the discrete passages 51 to 53 of the porous nozzle 50, and discharged through the plurality of outlets 51a' to 51h', 52a' to 52h' arranged alternately in circles in a predetermined plane facing the conveyer 30'. The streams of the liquid chocolate A to C are collected together by the uniting nozzle 60, and guided onto the conveyer 30'

For producing covered solidified chocolates (covered solidified articles) having the liquid chocolate C extending longitudinally as a central axis and a predetermined mingled composite pattern formed of two kinds of liquid chocolate A, B (viscous fluids) surrounding the liquid chocolate C, first each of the liquid chocolate A to C is continuously supplied at a predetermined ratio by a pump for high viscosity fluid (not shown), and guided separately through the discrete passages 51 to 53 of the porous nozzle 50. Then each of the liquid chocolate A to C continuously supplied is guided by the discrete passages 51 to 53 of the porous nozzle 50, respectively, so that the liquid chocolate A and B are discharged through the outlets 51a' to 51h', and 52a' to 52h', respectively, arranged alternately in circles in the predetermined plane facing the conveyer 30', and the predetermined amount of the liquid chocolate C is guided by the discrete passage 53, so that the liquid chocolate C is discharged through the outlet 53a' surrounded by the outlets 51a' to 51h' and 52a' to 52h' and placed in the center thereof. The streams of the liquid chocolate A and B discharged through the outlets 51a' to 51h' and 52a' to 52h' arranged alternately in circles and the stream of the liquid chocolate C discharged through the outlet 53a' surrounded by the outlets 51a' to 51h' and 52a' to 52h' are collected together by the uniting nozzle 60, guided onto the conveyer 30', solidified, and cut into pieces, thereby producing the covered solidified chocolate (covered solidified article) having the liquid chocolate C extending longitudinally as a central axis and the predetermined composite pattern formed of the liquid chocolate A, B surrounding the liquid chocolate C. In molding and solidifying the liquid chocolate A to C in the above process, a cooling machine may additionally be used, or a heating machine may also be used depending on the viscous fluid to be molded and solidified. In producing the covered solidified chocolates (covered solidified articles) with an apparatus of other embodiment of the present invention, the above procedure may be followed. Thus, the process is not described any further.

In the apparatus of this embodiment, the porous nozzle 50 (FIG. 10(a)) may be replace by other nozzles 50 as shown in FIGS. 7(a) and 7(b) as described above.

Further, in the apparatus of this embodiment, the uniting nozzle 60 (FIG. 10(b)) may be replaced by other uniting nozzles 80 as shown in FIGS. 8(a) and 8(b) as described above.

In the above embodiments, the porous nozzle 50 has been described as having the discrete passages 51 to 53 for separately guiding each of the liquid chocolate A to C integrally formed therein, but the porous nozzle of the present invention is not limited thereto. For example, the porous nozzle may be an assembly of a plurality of parts such as a nozzle provided with a discrete passage 51 for guiding mainly the liquid chocolate A, a nozzle provided with a discrete passage 52 for guiding mainly the liquid chocolate B, and a nozzle provided with a discrete passage 53 for guiding mainly the liquid chocolate C. With this embodiment, a covered solidified chocolate (a solidified article) having a predetermined composite pattern may be produced simply by arbitrarily combining each parts, and each parts may be detached easily for cleaning, thus being remarkably advantageous.

Further, the number of the outlets of each passage (discrete passages 51 to 53, 82 and uniting passage 61, 81) may be decided as desired; the configuration of the outlet may be decided as desired, such as triangle, rectangle, oval, or the like; and the arrangement of the outlets may be decided as desired, for example, the outlets may be arranged alternately in circles, or in a staggered pattern, regularly, or irregularly.

The conveyer employed in the present invention may be a conveyer 70' (FIG. 11(a)) having side walls 71' for preventing fluidization of the liquid chocolate along both sides of the conveyer, a conveyer 70' (FIG. 11(b)) provided with accommodating portions 72' as molds for receiving the liquid chocolate on the conveyer belt, a conveyer 70' (FIG. 11(c)) provided with a belt having concave and convex surface 73, or a conveyer having these structures in arbitrary combination. The accommodating portion 72' may be a mold representing a desired article, or a mold of any configuration.

Further, the composite pattern to be formed with the solidified chocolates (solidified articles) may also be controlled by changing the point in the accommodating portion 72' of the conveyer 70' on which the liquid chocolate A, B (viscous fluids) falls which is finally discharged through the outlets disposed facing the conveyer. Alternatively, in the porous nozzle 50, the discrete passage 53 may be branched, and a portion of the liquid chocolate guided by the discrete passage 53 may be discharged for use as the viscous fluid for forming the composite pattern. Alternatively, the configurations of the porous nozzle provided with the discrete passages and the uniting nozzle provided with the uniting passage is not limited to the reversed truncated cone, and may be any desired shape such as a rectangular parallelepiped.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A molding system for use in producing a solidified article having a predetermined composite pattern formed of at least two kinds of viscous fluids distinct from each other in color, said system comprising:

a first nozzle having opposite first and second ends and at least one first discrete passage per each of said viscous fluids for separately guiding throughout an entire length of said nozzle each of the viscous fluids, said each of the viscous fluids having been measured separately to have a predetermined amount, each of said first discrete passages having at least one first discrete passage inlet formed in said first end of said first nozzle, and a plurality of first discrete passage outlets formed in said second end of said nozzle, while at least one of said first discrete passages having one first discrete passage outlet formed in said second end of said nozzle, each of said first discrete passage outlets discharging said viscous fluids guided through the first discrete passage, said first discrete passage outlet being arranged on a single plane defined by the second end of the first nozzle.

2. The molding system as claimed in claim 1 wherein an arrangement of said first discrete passage inlets in said first end of said first nozzle and an arrangement of said first discrete passage outlets in said second end of said first nozzle are relatively different from each other.

3. The molding system as claimed in claim 1 further comprising:

a second nozzle having opposing first and second ends and at least one uniting passage communicating with said first discrete passage outlets discharging at least two kinds of the viscous fluids among all of said first discrete passage outlets of the first nozzle, said at least one uniting passage each having at least one uniting passage outlet formed in said second end of said second nozzle.

4. The molding system as claimed in claim 1 further comprising:

one of a unit mold and a conveyer for receiving all kinds of said viscous fluids discharged from said first nozzle.

5. The molding system as claimed in claim 3 further comprising:

one of a unit mold and a conveyer for receiving all kinds of said viscous fluids discharged from said second nozzle.

6. The molding system as claimed in claim 1 wherein said first discrete passage outlets are arranged in the second end of the first nozzle so that at least one first discrete passage outlet is surrounded by rest of the first discrete passage outlets.

7. The molding system of claim 3 wherein said first discrete passage outlets are arranged in the second end of the first nozzle so that at least one first discrete passage outlet is surrounded by rest of the first discrete passage outlets.

8. The molding system of claim 7 wherein said second nozzle further comprises:

at least one second discrete passage communicating with said at least one first discrete passage outlet of said first nozzle, said at least one second discrete passage each having at least one second discharge passage outlet for discharging said viscous fluid guided through said at least one second discrete passage.

9. The molding system of claim 8 further comprising a timing means for controlling timing for discharging the viscous fluids through said at least one uniting passage outlet and said at least one second discrete passage outlet of the second nozzle so that discharge of the viscous fluid through said at least one second discrete passage outlet starts later and ends earlier than discharge of the viscous fluids through said at least one uniting passage outlet.

10. The molding system of claim 5 wherein said system comprises said conveyer, and further comprises cutting means for cutting said all kinds of said viscous fluids received on the conveyer into pieces.

11. The molding system of claim 3 wherein said second nozzle comprises a plate having at least one orifice therein for passing the viscous fluids, said plate being disposed in the middle of the uniting passage in a plane transverse to a flow direction of the viscous fluids through the uniting passage.

12. The molding system of claim 5 further comprising rotatably driving means for rotating at least one of said first nozzle and said second nozzle around an axis perpendicular to the second end of the first nozzle.

13. A molding system for use in producing a solidified article having a predetermined composite pattern formed of at least two kinds of viscous fluids distinct from each other in color, said system comprising:

a first nozzle having opposing first and second ends and at least one first discrete passage per each of said viscous fluids for separately guiding throughout an entire length of said nozzle each of the viscous fluids, said each of the viscous fluids having been measured separately to have a predetermined amount, each of said first discrete passages having at least one first discrete passage inlet formed in said first end of said first nozzle and a plurality of first discrete passage outlets formed in said second end of said nozzle, each of said first discrete passage outlets discharging said viscous fluid guided through the first discrete passage, said first discrete passage outlets being arranged on a single plane defined by the second end of the first nozzle.

14. The molding system as claimed in claim 13 further comprising:

a second nozzle having opposing first and second ends and at least one uniting passage communicating with said first discrete passage outlets discharging at least two kinds of the viscous fluids among all of said first discrete passage outlets of the first nozzle, said at least one uniting passage each having at least one uniting passage outlet formed in said second end of said second nozzle.

15. The molding system as claimed in claim 13 further comprising:

one of a unit mold and a conveyer for receiving all kinds of said viscous fluids discharged from said first nozzle.

16. The molding system of claim 13 wherein said second nozzle further comprises:

at least one second discrete passage communicating with said at least one first discrete passage outlet of said first nozzle, said at least one second discrete passage each having at least one second discrete passage outlet for discharging said viscous fluid guided through said at least one second discrete passage.

17. The molding system of claim 14 wherein said second nozzle comprises a plate having at least one orifice therein for passing the viscous fluids, said plate being disposed in the middle of the uniting passage in a plane transverse to a flow of direction of the viscous fluids through the uniting passage.

18. The molding system of claim 13 further comprising rotatably driving means for rotating at least one of said first nozzle and said second nozzle around an axis perpendicular to the second end of the first nozzle.

\* \* \* \* \*

UNITED STATES PATENT AND TRADEMARK OFFICE
CERTIFICATE OF CORRECTION

PATENT NO.      : 6,283,742 B1
DATED           : September 4, 2001
INVENTOR(S)     : Tokuji Akutagawa It is certified that error appears in the above-identified patent and that said Letters Patent is hereby corrected as shown below:

<u>Title page,</u>
Item [73], Assignee name, "Confectionary" should read -- Confectionery --.

<u>Column 28,</u>
Line 16, reads: "first nozzle, and a plurality of first discrete passage outlets formed in said second end of said nozzle," should read -- first nozzle, a portion of said first discrete passages having a plurality of first discrete passage outlets formed in said second end of said nozzle, --.
Line 65, "discharge" should read -- discrete --.

Signed and Sealed this

Thirteenth Day of August, 2002

*Attest:*

*Attesting Officer*

JAMES E. ROGAN
*Director of the United States Patent and Trademark Office*